US009618381B1

(12) United States Patent
Dudar

(10) Patent No.: US 9,618,381 B1
(45) Date of Patent: Apr. 11, 2017

(54) SYSTEMS AND METHODS FOR FUEL LEVEL INDICATOR FUNCTIONAL DIAGNOSTICS

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/079,362

(22) Filed: Mar. 24, 2016

(51) Int. Cl.
*G01F 25/00* (2006.01)
*G01F 23/30* (2006.01)
*F02M 37/00* (2006.01)
*F02M 37/04* (2006.01)
*F02M 25/08* (2006.01)
*B60K 35/00* (2006.01)
*B60K 15/03* (2006.01)

(52) U.S. Cl.
CPC .......... *G01F 25/0069* (2013.01); *B60K 35/00* (2013.01); *F02M 25/0836* (2013.01); *F02M 25/0854* (2013.01); *F02M 25/0872* (2013.01); *F02M 37/0082* (2013.01); *F02M 37/04* (2013.01); *G01F 23/30* (2013.01); *B60K 2015/03217* (2013.01)

(58) Field of Classification Search
CPC ..... G01F 25/0069; G01F 23/30; B60K 35/00; B60K 2015/03217; F02M 25/0836; F02M 25/0854; F02M 25/0872; F02M 37/0082; F02M 37/04
USPC ....................................................... 701/123
See application file for complete search history.

(56) References Cited

U.S. PATENT DOCUMENTS

| | | | | | |
|---|---|---|---|---|---|
| 2,582,655 | A | * | 1/1952 | Schenk | B65D 5/5445 206/443 |
| 3,777,147 | A | * | 12/1973 | Hoyer | G01V 5/102 250/264 |
| 5,153,644 | A | * | 10/1992 | Yang | G03G 15/5033 347/247 |
| 5,808,779 | A | * | 9/1998 | Weis | E21B 47/123 356/32 |
| 5,898,517 | A | * | 4/1999 | Weis | E21B 47/123 356/32 |
| 6,397,668 | B1 | | 6/2002 | Davison et al. | |
| 6,763,713 | B2 | | 7/2004 | Kim et al. | |
| 6,904,783 | B2 | | 6/2005 | Elenich et al. | |
| 7,458,246 | B2 | | 12/2008 | Grunwald et al. | |

(Continued)

*Primary Examiner* — McDieunel Marc
*Assistant Examiner* — James E Stroud
(74) *Attorney, Agent, or Firm* — James Dottavio; McCoy Russell LLP

(57) ABSTRACT

A method for a fuel system comprises receiving a first indication of inconsistency in a fuel level indicator output during a fuel consumption cycle, receiving a second indication of inconsistency in a fuel level indicator output during a refueling event, and indicating electrical degradation of the fuel level indicator responsive to the first and second indications of inconsistency indicating coincident ranges of inconsistency for the fuel level indicator output. By gauging the consistency of a fuel level indicator output during both upward and downward travel, electrical degradation may be distinguished from mechanical degradation. In this way, a range of inconsistency may be determined, and a reported fuel level adjusted while the fuel level indicator output is within the range of inconsistency.

19 Claims, 10 Drawing Sheets

(56) References Cited

U.S. PATENT DOCUMENTS

| | | |
|---|---|---|
| 7,675,405 B2 | 3/2010 | Rumpf |
| 7,878,057 B2 | 2/2011 | Wang et al. |
| 2006/0205054 A1* | 9/2006 | O'Brien ............. C07K 14/4748 435/212 |
| 2009/0321159 A1* | 12/2009 | Andri .................... B60L 11/123 180/65.25 |
| 2016/0082832 A1 | 3/2016 | Dudar et al. |
| 2016/0319758 A1* | 11/2016 | Pallett .................... H02P 9/008 |

* cited by examiner

SYSTEMS AND METHODS FOR FUEL LEVEL INDICATOR FUNCTIONAL DIAGNOSTICS

FIELD

The present description relates generally to methods and systems for diagnosing and mitigating malfunctions of a fuel level indicator.

BACKGROUND/SUMMARY

Accurately determining and indicating the amount of fuel contained within a fuel tank can often be critical for a vehicle operator. The fuel level may be used to determine when and where the vehicle should be refueled prior to the fuel tank being emptied. A typical fuel tank utilizes a dedicated fuel level sensor, such as a floating sensor, to determine the amount of fuel remaining in the fuel tank. However, if the floating sensor becomes stuck, malfunctions, or becomes decoupled from the vehicle powertrain control module, the fuel level may become unknown. An in-dash fuel level gauge may provide an inaccurate or indeterminate fuel level to the vehicle operator. This may lead to the vehicle running out of fuel if the fuel level indicator suggests fuel is still remaining in the tank, or may lead to increased operator anxiety stemming from not knowing how much fuel is remaining in the tank.

Periodically, diagnostic tests may be performed on the fuel level indicator. However, current tests often include monitoring output of the fuel level indicator over a period of 100 miles of engine combustion. For hybrid vehicles, and other vehicles capable of operating without engine combustion for long periods of time, the test may take a long time to complete. Further, such a test does not necessarily cover the entire range of the fuel level indicator. A fuel level indicator that is prone to stick or has a worn resistive track that effects output only at certain fuel levels may go undiagnosed.

Other attempts to address fuel level indicator degradation include monitoring the output of a fuel level indicator during a refueling event. One example approach is shown by Grunwald et al. in U.S. Pat. No. 7,458,246. Therein, fuel temperature is monitored during a refueling event, and the change in fuel temperature is used to discern the change in fuel volume, which is then compared to the fuel level indicator output.

However, the inventors herein have recognized potential issues with such methods. For example, this strategy may not adequately gauge the entire range of the fuel level indicator. Additionally, such strategies may not discern between electrical and mechanical degradation of the fuel level indicator. As such, it may not be possible to predict how the fuel level indicator output may be affected during a fuel consumption cycle. Accordingly, the reported fuel level cannot be adjusted intrinsically, and thus may provide incorrect information to the vehicle operator during certain ranges of fuel level indicator output.

In one example, the issues described above may be addressed by a method for a fuel system that comprises receiving a first indication of inconsistency in a fuel level indicator output during a fuel consumption cycle, receiving a second indication of inconsistency in a fuel level indicator output during a refueling event, and indicating electrical degradation of the fuel level indicator responsive to the first and second indications of inconsistency indicating coincident ranges of inconsistency for the fuel level indicator output. By gauging the consistency of a fuel level indicator output during both upward and downward travel, electrical degradation may be distinguished from mechanical degradation. In this way, a range of inconsistency may be determined, and a reported fuel level adjusted while the fuel level indicator output is within the range of inconsistency.

As one example, the reported fuel level may be based on an inferred fuel level while the fuel level indicator output is within the range of inconsistency. An inferred fuel level may be determined based on a summation of fuel consumption following a refueling event or other time point where the fuel fill level is known independently from the fuel level indicator output. In this way, the reported fuel level can achieve a degree of accuracy for the entirety of the fuel level indicator range, despite the electrical degradation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
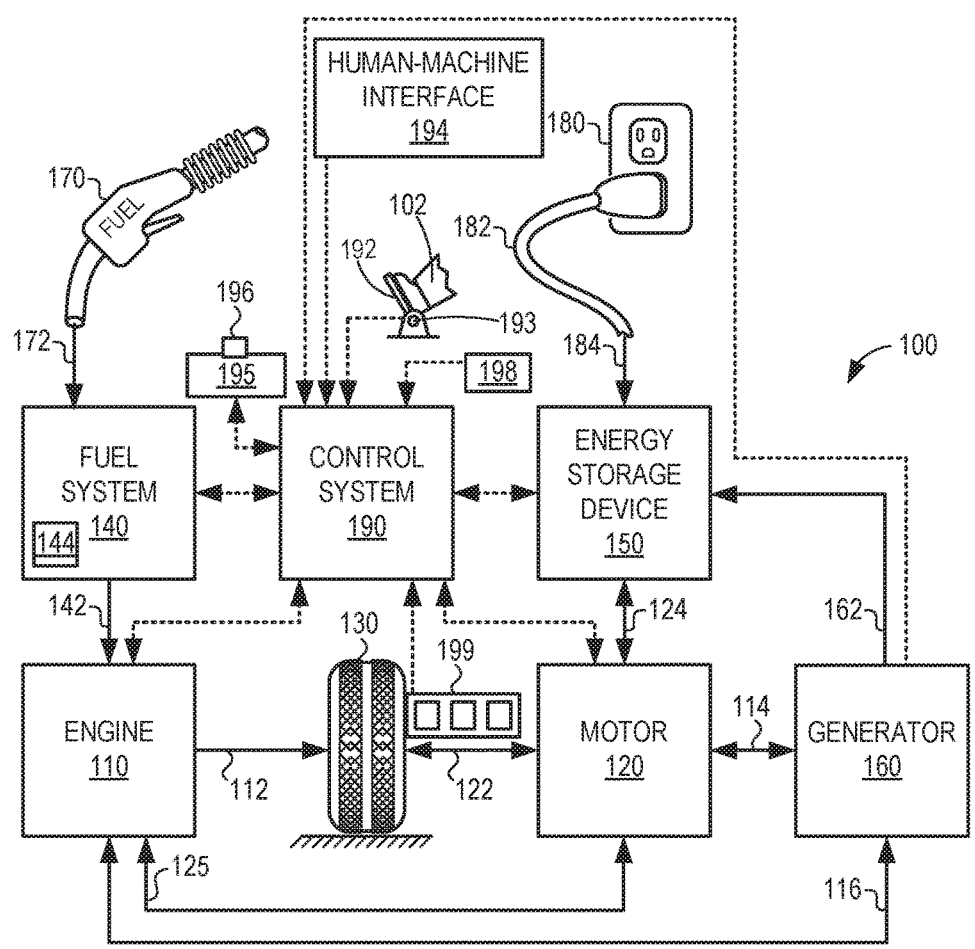
FIG. 1 schematically shows an example vehicle propulsion system.
Figure 2:
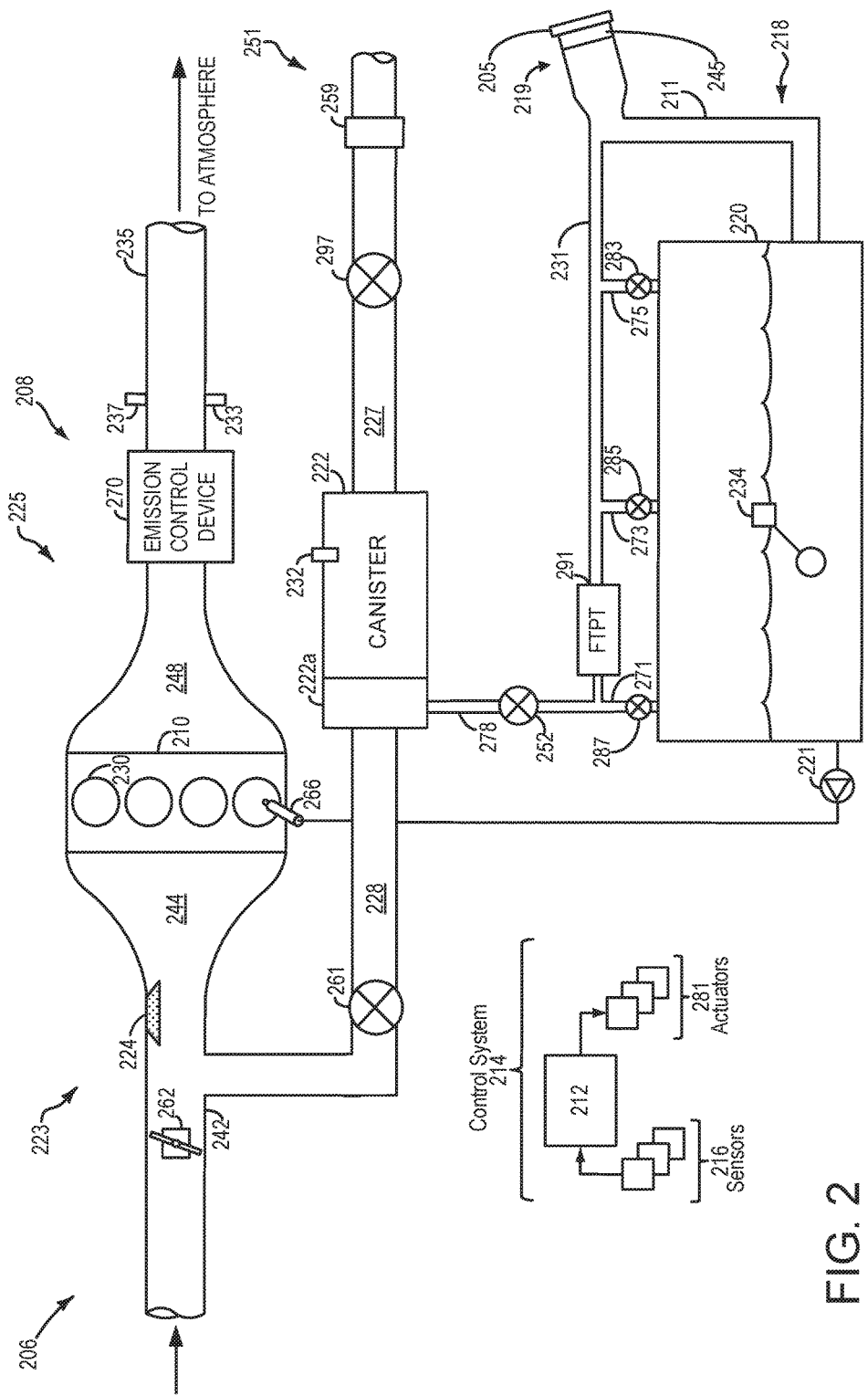
FIG. 2 schematically shows an example vehicle system with a fuel system and an evaporative emissions system.
Figure 3A:
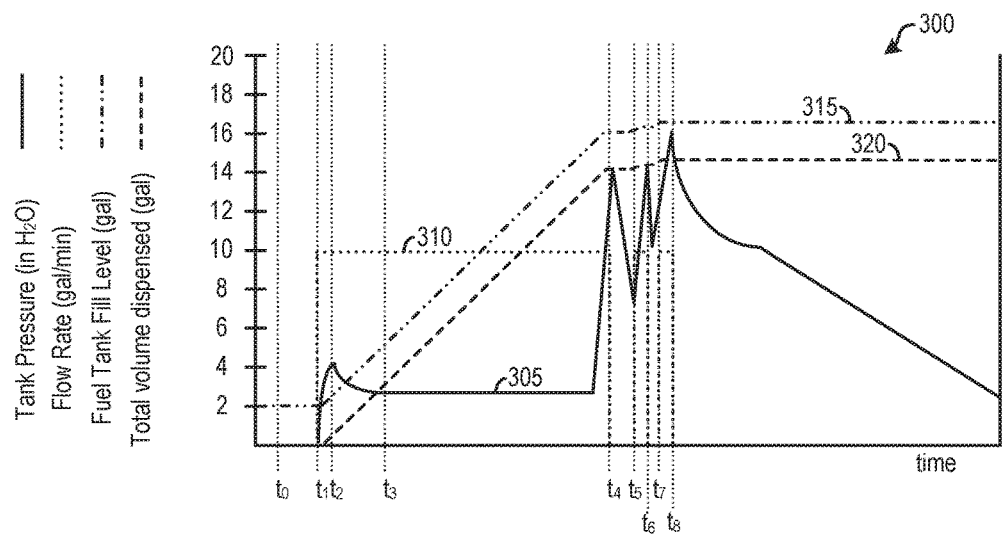
FIG. 3A shows an example timeline for a refueling event.
Figure 3B:
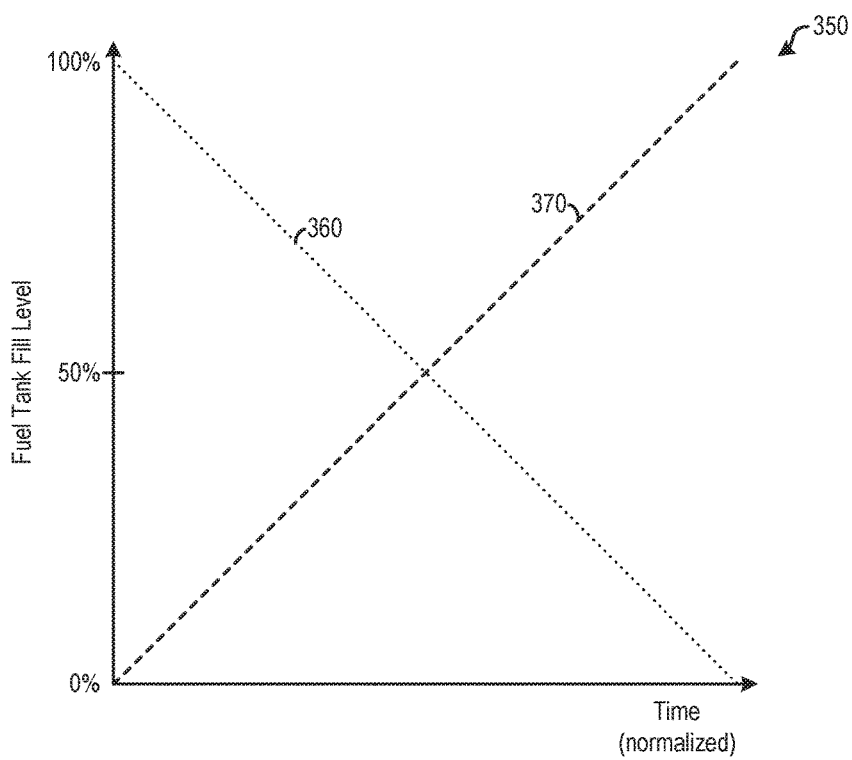
FIG. 3B shows an example response for an intact fuel level indicator during fuel consumption and refueling.

The following description relates to systems and methods for a vehicle fuel system. More specifically, the description relates to determining inconsistencies in the output of a mechanical fuel level indicator, and further relates to distinguishing electrical-based inconsistencies and mechanical-based inconsistencies. As shown in FIG. 1, a hybrid vehicle propulsion system may include a fuel system as well as a human-machine interface where information pertinent to vehicle operation, such as current fuel level may be relayed to the vehicle operator. The vehicle fuel system may be coupled to a refueling system and to an engine system, as shown in FIG. 2, and may include a fuel level indicator within a fuel tank. Based on the output of the fuel level indicator, a current fuel level may be relayed to the vehicle operator. The fuel level indicator may be subject to periodic rationality testing. As shown in FIG. 3A, during a refueling event, the fuel tank pressure profile is indicative of both the residual amount of fuel within the fuel tank and the amount of fuel added. This enables the range of the fuel level indicator to be gauged over a refueling event. The range of the fuel level indicator may also be gauged during a fuel consumption cycle. As depicted in FIG. 3B, when normalized for time, the profile of the fuel level indicator output during refueling should mirror the profile of the fuel level indicator output during fuel consumption.

Figure 4:
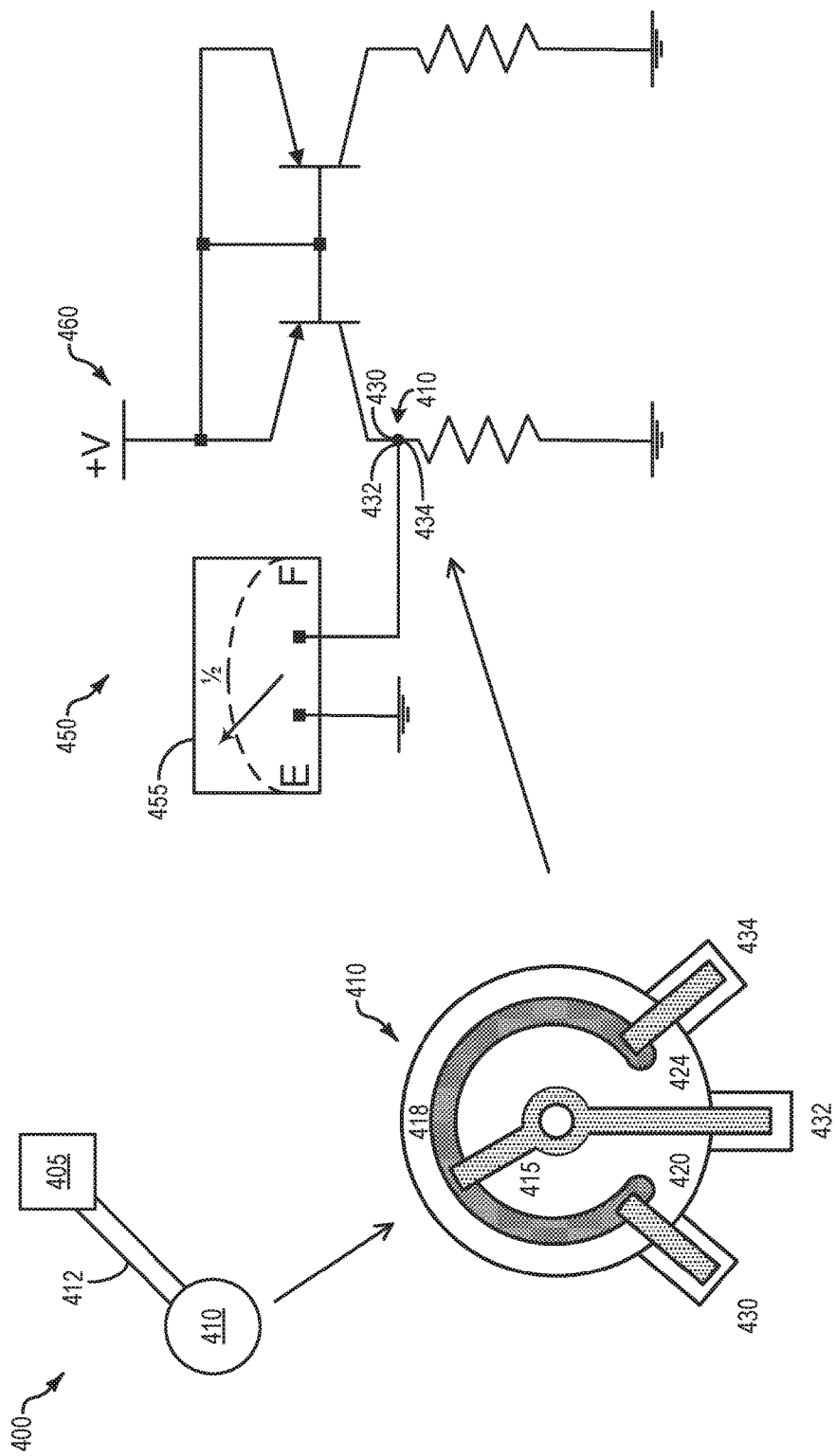
FIG. 4 schematically shows an example circuit for a fuel level indicator and fuel gauge.
Figure 5A:
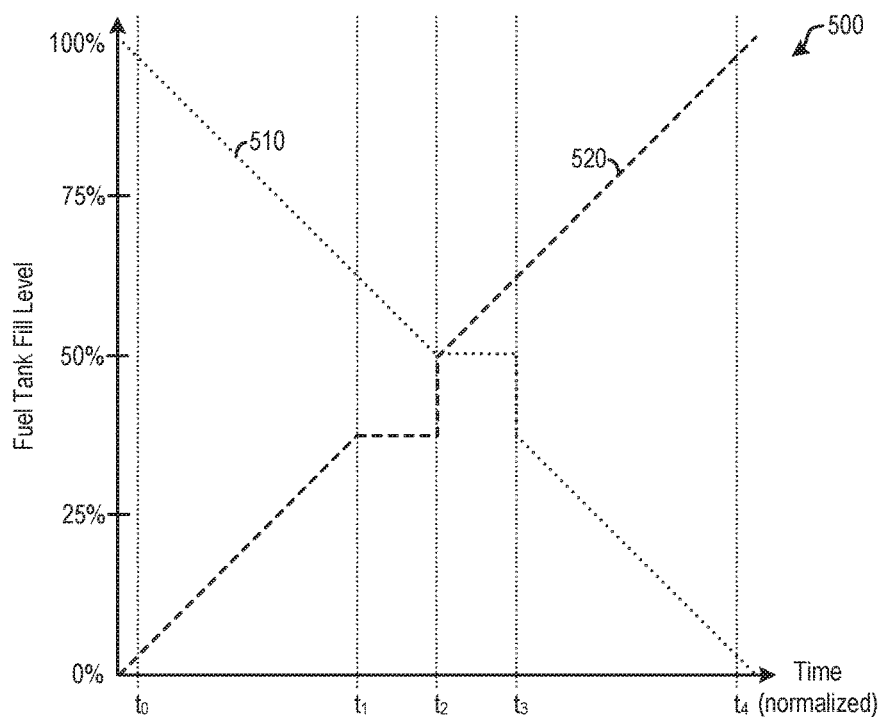
FIG. 5A shows an example response for fuel level indicator with an electrical inconsistency during fuel consumption and refueling.
Figure 5B:
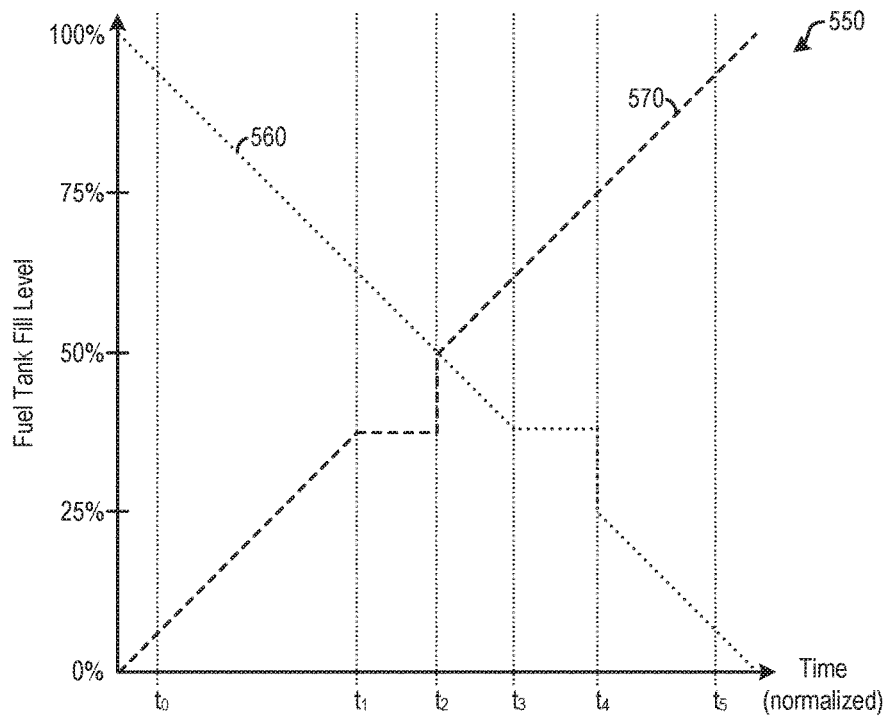
FIG. 5B shows an example response for an intact fuel level indicator with a mechanical inconsistency during fuel consumption and refueling.

Most vehicles utilize a mechanical fuel level indicator, such as the fuel level indicator shown schematically in FIG. 4. Such a fuel level indicator is subject to mechanical degradation, such as a bent float arm, as well as electrical degradation, such as a worn resistive track. Electrical degradation typically produces fuel level indicator output inconsistencies that are repeated during both upward travel of the fuel level indicator (refueling) and downward travel of the fuel level indicator (fuel consumption) as shown in FIG. 5A. Conversely, as shown in FIG. 5B, mechanical degradation may produce fuel level indicator output inconsistencies that are erratic. By monitoring the output of the fuel level indicator during both refueling and fuel consumption, using the method of FIG. 6 as an example, the differing types of degradation may be diagnosed, inaccurate fuel level gauge readings due to electrical degradation of the fuel level indicator may be corrected, thus mitigating potential problems arising from incorrectly reporting the current fuel level to the vehicle operator.

Figure 7:
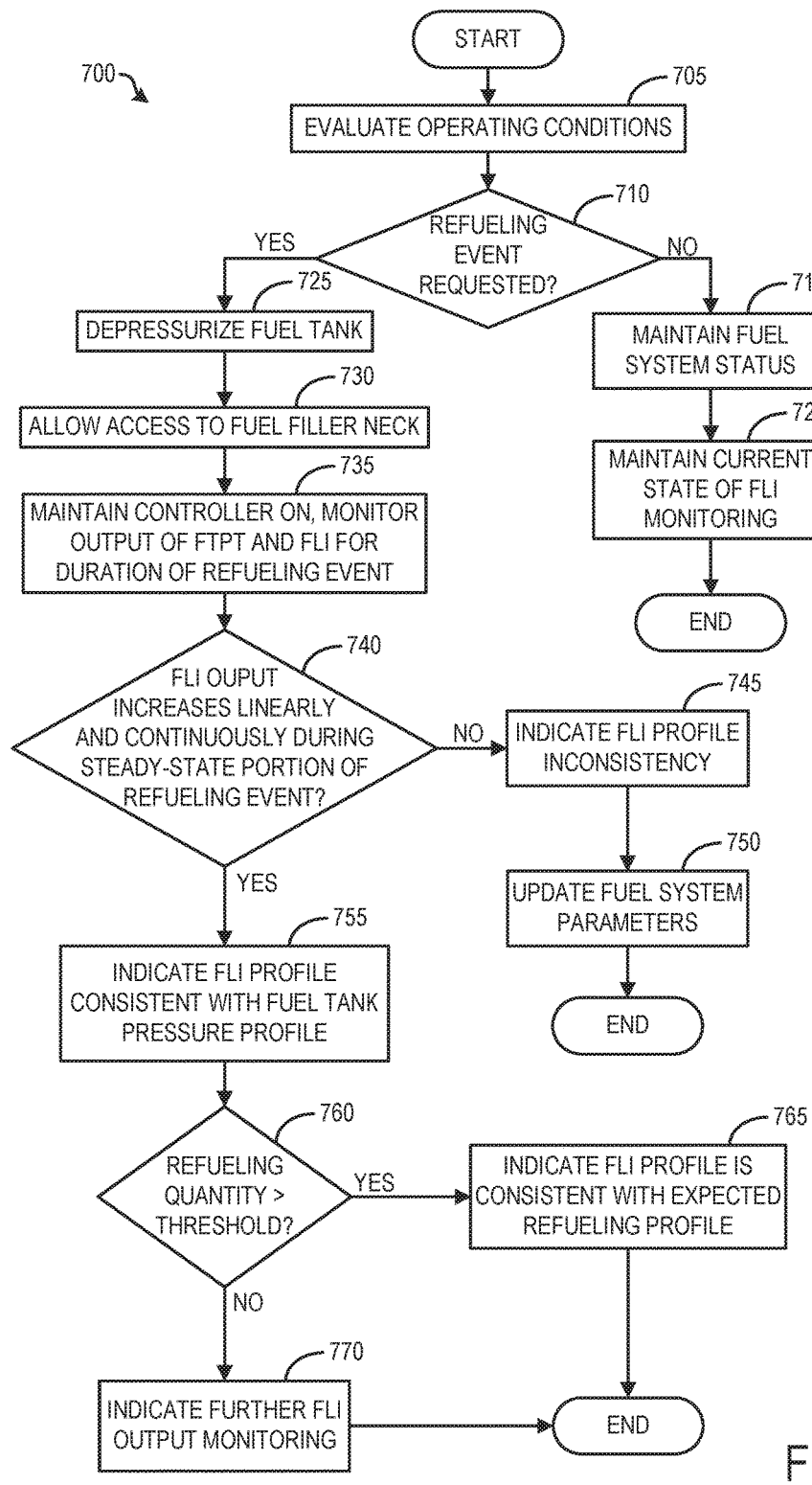
FIG. 7 depicts a flow chart for a high level method for diagnosing fuel level indicator inconsistencies during a refueling event.
Figure 8:
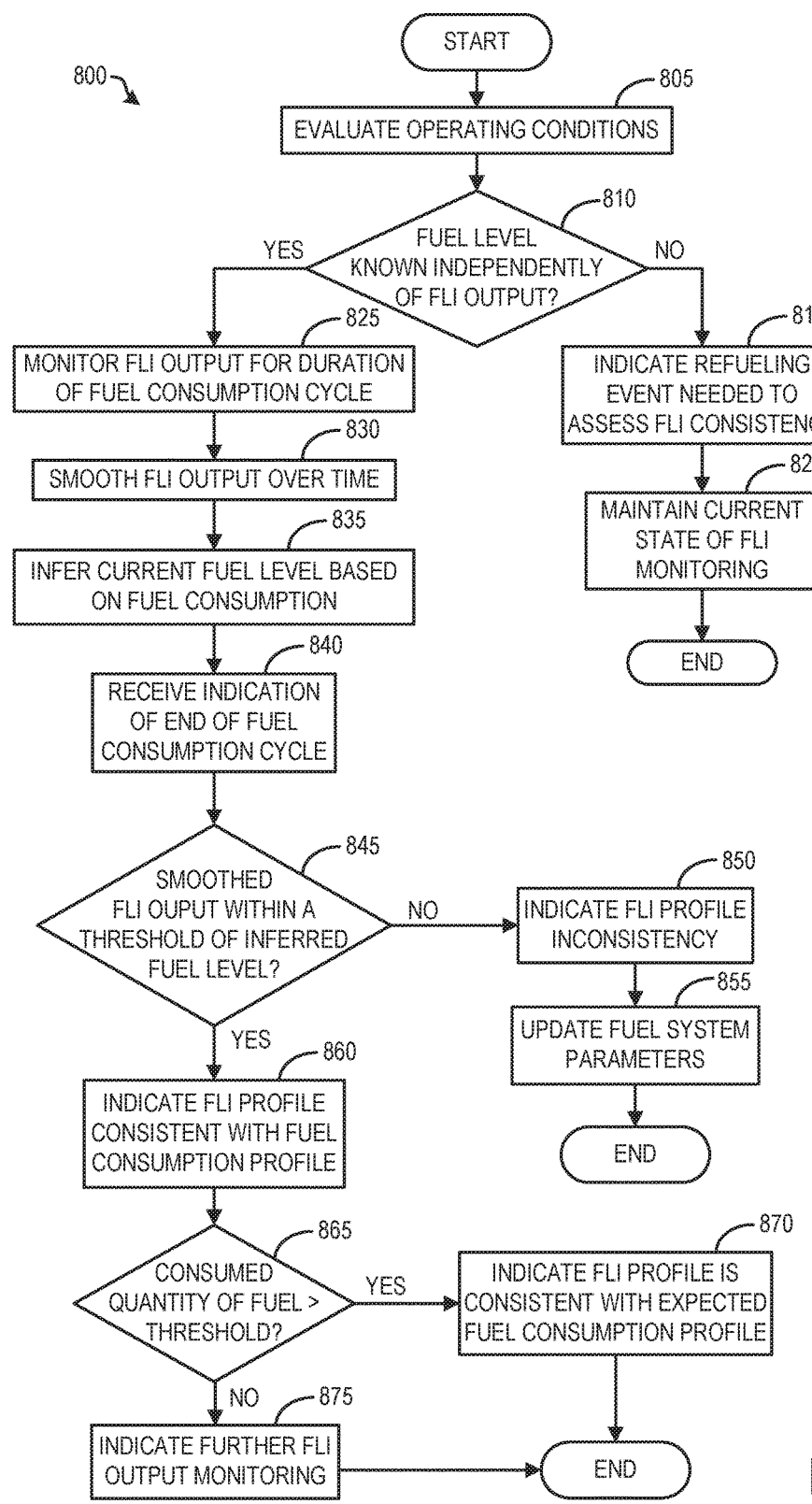
FIG. 8 depicts a flow chart for a high level method for diagnosing fuel level indicator inconsistencies during a fuel consumption cycle.
Figure 10:
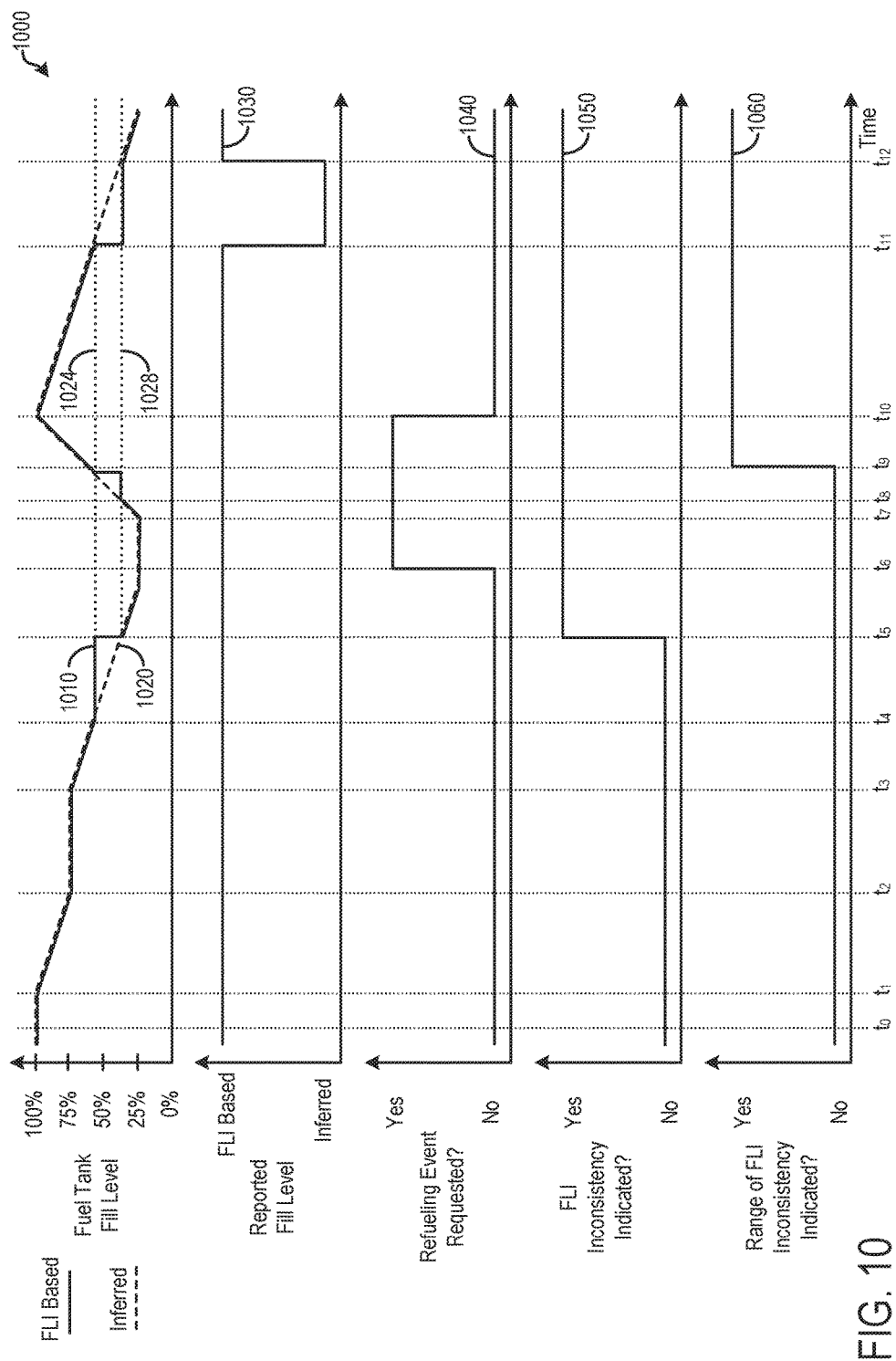
FIG. 10 depicts a timeline for operating a vehicle fuel system in accordance with the methods shown in FIGS. 6-9.

During refueling, the fuel level indicator output may be monitored and compared to an estimated fuel level profile generated based on the fuel tank pressure profile, as depicted in FIG. 7. During a fuel consumption cycle, if the fuel tank fill level is known (e.g., following a refueling event), an inferred fuel level may be determined based on the amount of fuel consumed, and compared to the fuel level indicator output, as shown in FIG. 8. Any inconsistencies reported during monitoring may then be compared. If the inconsistencies reflect electrical degradation of the fuel level indicator, then an inferred estimate of the fuel level may be kept and reported at the fuel level gauge instead of a measured fuel level when the fuel level indicator output is within the identified range of inconsistency. An example timeline depicting a fuel consumption cycle, refueling event, and subsequent adjusting of reported fuel level is shown in FIG. 10.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130 (either directly, or via motor 120), where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 as indicated by arrow 125, which may in turn provide a generator function to convert the engine output to electrical energy, where the electrical energy may be stored at energy storage device 150 for later use by the motor.

In some embodiments, motor 120 may be operated to rotate engine 110, as indicated by arrow 125. Generator 160 may also be operated to rotate engine 110 in addition to or as an alternative to motor 120. As an example, motor 120 may be operated as a starter motor by rotating engine 110 during a cold start operation. Motor 120 and/or generator 160 may rotate engine 110 without providing fuel to the engine for combustion. For example, during an electric-only mode of operation, rotating the engine may allow for the rotational velocity a rotating transmission component to be maintained or adjusted while concurrently adjusting the torque provided to drive wheels 130. In some scenarios, the engine may be rotated unfueled by the motor and/or generator in order to generate intake vacuum without expending fuel. Such unfueled rotation may be accomplished while the motor and/or generator are being utilized to propel the vehicle, and/or while the motor and/or generator are disengaged from the drive wheels (e.g., while the vehicle is parked, at an idle-stop, during decel fuel shutoff mode). In some examples, the engine may be rotated unfueled in a reverse (opposite) direction from the default (forward) direction of engine rotation. In this way, a vacuum may be generated in the engine exhaust.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 6-9, control system 190 may receive sensory feedback information from one or more of engine 110, motor 120, fuel system 140, energy storage device 150, and generator 160. Further, control system 190 may send control signals to one or more actuators of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 193 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication via human-machine interface 194.

Human-machine interface 194 may include a vehicle instrument panel 195. The vehicle instrument panel 195 may include indicator light(s), gauges, and/or a text-based display in which messages are displayed to an operator. For example, vehicle instrument panel 195 may indicate a current fuel level, current vehicle velocity, current engine speed, current engine temperature, etc. In some embodiments, the vehicle instrument panel 195 may communicate audio messages to the operator with or without displaying a visual message. The vehicle instrument panel 195 may also include various input portions for receiving an operator input, such as buttons, touch screens, voice input/recognition, etc. For example, the vehicle instrument panel 195 may include a refueling button 196 which may be manually actuated or pressed by a vehicle operator to initiate refueling. For example, as described in more detail below, in response to the vehicle operator actuating refueling button 196, a fuel tank in the vehicle may be depressurized so that refueling may be performed.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods.

The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a non-zero threshold, such as atmospheric pressure. In response to a refuel request, e.g., a vehicle operator initiated request, the fuel tank may be depressurized and the fuel cap unlocked after the pressure or vacuum in the fuel tank falls below a non-zero threshold (e.g., an absolute pressure threshold above and/or below atmospheric pressure). A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a non-zero absolute pressure threshold. For example, a refueling door may comprise an access panel in the vehicle body that is selectively locked and unlocked via a pin mechanism. Controller 212 may unlock the access panel via a solenoid actuator coupled to a pin. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a non-zero threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a non-zero threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas oxygen sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include intake throttle 262, fuel tank isolation valve 253, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. For example, control system 214 may receive input data from pressure sensor 291 and fuel level indicator 234, process the received data, and actuate one or more of fuel pump 221, FTIV 252, CVV 297, and refueling lock 245. Example control routines are described herein with regard to FIGS. 6-9.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

For vehicles with a sealed fuel tank, fuel vapor pressure within the fuel tank increases over the course of a vehicle fuel consumption cycle. The fuel vapor may be vented to the fuel vapor canister to relieve excessive tank pressure. However, often the fuel tank is maintained sealed until a refueling event is requested, whereby excess vapor is vented prior to allowing access to the fuel filler neck in order to prevent undesired emissions and/or liquid fuel expulsion by coupling a pressurized fuel tank to atmosphere via the fuel filler neck. The depressurization of the fuel tank and regulation of access to the fuel filler neck may require the use of the vehicle controller and battery in order to supply current to the relevant valves and to receive feedback from the fuel tank pressure sensor. As such, the vehicle controller may remain operative for the duration of a refueling event, though the controller may be operated in a reduced-power mode. With the vehicle controller operative, input data may be received from fuel system sensors during the refueling event, such as the fuel level indicator and fuel tank pressure sensor. This data may be used to update vehicle operating parameters at the controller, and may further be used to perform one or more diagnostic tests.

FIG. 3A shows an example timeline for a refueling event in accordance with the current disclosure. FIG. 3A depicts timeline 300. Timeline 300 includes plot 305, indicating a fuel tank pressure (in inH$_2$O) over time. Timeline 300 further includes plot 310, indicating the flow rate of a liquid fuel (in gallons/min) from a fuel dispenser into a fuel tank over time. Timeline 300 further includes plot 315, indicating the total volume of fuel dispensed (in gallons) into the fuel tank over time. Timeline 300 further includes plot 320, indicating the fuel tank fill level (in gallons) over time.

At time $t_0$, the fuel tank has been depressurized to atmospheric pressure, as indicated by plot 305, but no fuel is being dispensed into the tank, as indicated by plot 310. The fuel tank includes 2 gallons of fuel, as indicated by plot 315. At time $t_1$, a refueling event begins. The fuel dispenser in this example dispenses liquid fuel at a rate of 10 gallons/min, as shown by plot 310. The amount of fuel in the tank increases accordingly, as shown by plot 315, as does the total amount of fuel dispensed, as shown by plot 320.

From time $t_1$ to time $t_2$, the fuel tank pressure undergoes an initial pressure rise. The rate of change of this initial pressure rise is directly proportional to the vapor dome space within the fuel tank, and is thus proportional to the amount of fuel in the fuel tank at the initiation of refueling. From time $t_2$ to time $t_3$, the fuel tank pressure decreases to a steady-state pressure. The steady-state pressure is directly proportional to the flow rate of fuel dispensed in to the fuel tank. As such, the amount of fuel dispensed into the fuel tank can be determined based on the steady-state pressure and the duration of the refueling event. The fuel tank pressure is maintained at the steady-state pressure from time $t_3$ to time $t_4$.

At time $t_4$, the fuel tank reaches a predetermined full fill level, as shown by plot 315. Approaching the full fill level causes the fuel tank pressure to rise, as shown by plot 305. The rise in fuel tank pressure causes an automatic shut-off signal to be sent to the fuel dispenser. Accordingly, the fuel dispenser is shut off at time $t_4$, and fuel dispensing ceases, as shown by plot 310.

From time $t_5$ to time $t_6$, the fuel dispenser operator attempts to trickle-fill additional fuel in the fuel tank, as shown by plot 310. Accordingly, fuel tank pressure increases, as shown by plot 305, although a minimal amount of fuel is added to the tank, as shown by plot 320. At time $t_6$, another automatic shut-off event occurs. As such, the fuel tank dispenser is shut off, as shown by plot 310, and fuel tank pressure decreases, as shown by plot 305. Another trickle-filling event followed by an automatic shut-off event occurs from time $t_7$ to time $t_8$. Following time $t_8$, the fuel tank pressure decreases, as shown by plot 305. The refueling event is then finalized.

As the fuel tank pressure profile and fuel tank fill level during the refueling event are correlated, the fuel tank pressure profile may be utilized to determine whether the fuel level indicator is consistently indicating the fuel level over the course of the refueling event. The initial pressure spike (from time $t_1$ to time $t_2$) is proportionate to amount of residual fuel in the fuel tank at the initiation of refueling. The steady state pressure (from time $t_3$ to time $t_4$) is proportionate to the flow rate of fuel into the fuel tank. Using this information, an estimated fuel level indicator profile may be established for the refueling event, and the actual fuel level indicator profile may be compared to the estimated profile. This allows for a wide range of the fuel level indicator output to be analyzed quickly. Additionally, the output of the fuel level indicator may be monitored over the course of a fuel consumption cycle. An expected fuel level may be determined based on fuel consumed, e.g., by summing fuel injection pulse widths over time.

FIG. 3B shows a normalized timeline 350, illustrating expected fuel level indicator outputs during fuel consumption and refueling. Plot 360 indicates a fuel level indicator output over time during a fuel consumption cycle. The output is both linear and continuously decreasing. Such an output indicates that the fuel level indicator output is rational and consistently reflective of the actual fuel fill level. Plot 370 indicates a fuel level indicator output over time during a refueling event, where time is normalized based on the range of the fuel level indicator output and duration of the fuel consumption cycle illustrated by plot 360. Plot 370 also depicts a fuel level indicator output that is linear and continuous over the refueling event. Further, the two output curves are symmetric, thus validating that the fuel level indicator output is rational.

FIG. 4 schematically depicts an example system for a mechanical fuel level indicator 400 configured to reside within a fuel tank. Fuel level indicator 400 (FLI) includes float 405, which is coupled to potentiometer 410 via float arm 412. Float 405 is configured to rest on or near the surface of the fuel stored within the fuel tank comprising FLI 400. As the fuel level within the fuel tank changes, the position of float 405 changes accordingly. As float 405 moves, float arm 412 moves in concert, adjusting the position of potentiometer 410.

Potentiometer 410 includes a wiper 415 in contact with a resistive material 418. In some examples, resistive material 418 may include one or more resistive tracks. Wiper 415 is moveable along resistive material 418 between points 420 and 424, and is moved mechanically by float arm 412 based on the position of float 405. Potentiometer 410 may be coupled directly to an inner surface of the fuel tank, and/or to additional elements of the fuel system within the fuel tank, such as a fuel pump or fuel filter.

Potentiometer 410 has three electrical terminals 430, 432, and 434. Terminal 432 may be physically and electrically coupled to wiper 415. Fuel level indicator circuit 450 depicts terminal 432 coupled to an in-dash fuel level gauge 455. In some examples, terminal 432 may be additionally or alternatively connected to the vehicle controller. Terminal 430 may be electrically coupled to a voltage source, such as voltage source 460, while terminal 434 may be electrically coupled to ground. The voltage supplied to terminal 434 may be considered a maximum, or total voltage (V). The electrical resistance between terminal 430 and terminal 434 may be considered a maximum, or total resistance (R). The output of terminal 432 may thus indicate a voltage differential across terminals 430 and 434. The voltage differential output from terminal 432 may thus be proportionate to the position of wiper 415 along resistive material 418, and thus be proportionate to the position of float 405 relative to a maximum fuel fill level.

If the fuel level indicator malfunctions, the in-dash fuel level gauge may not accurately reflect the amount of fuel stored in the fuel tank. This could result in the vehicle operator becoming oblivious to the current fuel level, potentially causing the vehicle to run out of fuel. Alternatively, undue stress could be placed on the vehicle operator if a low-fuel indication is displayed unexpectedly. Further, downstream calculations, such as miles-to-empty and fuel economy may be skewed incorrectly. On-board tests which depend on an accurate fuel level measurement, such as undesired emissions tests, may result in false failures or false passes.

The FLI may generate an output that is inconsistent or incorrect due to electrical degradation, mechanical degradation, and/or other intermittent degradation. In some scenarios, the FLI may experience "in-range" failures which may be due to mechanical degradation, such as a bent float arm or impeded float/float arm movement, or electrical degradation, such as a degraded resistive track or loose wiring which may be disturbed due to road conditions.

Certain fuel types, such as M15 methanol/gasoline blends, tend to be corrosive. When combined with normal wear and tear of the potentiometer wiper, the potentiometer resistive track may experience wear. Such wear may decrease continuity in FLI output over a region of the resistive track, which may thus produce erratic readings when the fuel fill level is within a corresponding range. As such, dual resistive tracks may be implemented, although this does not preclude both tracks from experiencing wear in the same region.

Resistive track wear may thus yield a range of FLI output values that are repeatedly inconsistent, whereas mechanical issues, such as a bent float arm may produce more erratic inconsistencies. As such, by monitoring the FLI output during both fuel consumption and refueling, symmetrical inconsistencies may be considered to be representative of electrical degradation, while asymmetrical inconsistencies may be considered to be representative of mechanical degradation.

FIG. 5A shows an example timeline 500 illustrating fuel level indicator outputs during fuel consumption and refueling for an FLI with a worn resistive track. Timeline 500 includes plot 510, indicating an FLI output over time during a fuel consumption cycle. Timeline 500 further includes plot 520, indicating an FLI output over time during a refueling event. Plots 510 and 520 have been normalized with respect to time, such that the rate of consumption over time is the inverse of the rate of fuel addition over time. Plot 510 thus depicts fuel consumption from a full tank to an empty tank, while plot 520 depicts a refueling event which increases fuel level from an empty tank to a full tank.

As shown by plot 510, the output of the FLI decreases linearly and consistently from time $t_0$ (~100% full) through time $t_1$ (~68% full) and from time $t_1$ to time $t_2$ (~50% full). However, the FLI output is relatively constant and does not decrease from time $t_2$ to time $t_3$ (~38% full). From time $t_3$ to time $t_4$ (~0% full), the FLI output again decreases linearly and consistently. As such, the range of FLI output between 38% full and 50% full may be indicated to be inconsistent, and may be flagged for follow-up during a subsequent refueling event, such as the refueling event represented by plot 520. As shown by plot 520, the output of the FLI increases linearly and consistently from time $t_0$ (~0% full) through time $t_1$ (~38% full), but is relatively constant and does not increase from time $t_1$ to time $t_2$ (~50% full). From time $t_2$ to time $t_3$ (68% full), and from $t_3$ to time $t_4$ (~100% full), the FLI output again increases linearly and consistently. These example results demonstrate that the FLI output is inconsistent within the range of ~38% full to ~50% full, and FLI degradation is most likely due to resistive track wear at the FLI potentiometer in the corresponding range.

FIG. 5B shows an example timeline 550 illustrating fuel level indicator outputs during fuel consumption and refueling for an FLI with a bent float arm. Timeline 550 includes plot 560, indicating an FLI output over time during a fuel consumption cycle. Timeline 560 further includes plot 570, indicating an FLI output over time during a refueling event. Plots 560 and 570 have been normalized with respect to time, such that the rate of consumption over time is the inverse of the rate of fuel addition over time.

As shown by plot 560, the output of the FLI decreases linearly and consistently from time $t_0$ (~100% full) through time $t_1$ (~68% full), from time $t_1$ to time $t_2$ (~50% full), and from time $t_2$ to time $t_3$ (~38% full). However, the FLI output is relatively constant and does not decrease from time $t_3$ to time $t_4$ (~25% full). From time $t_4$ to time $t_5$ (~0% full), the FLI output again decreases linearly and consistently. As such, the range of FLI output between 25% full and 38% full may be indicated to be inconsistent, and may be flagged for follow-up during a subsequent refueling event, such as the refueling event represented by plot 570. As shown by plot 570, the output of the FLI increases linearly and consistently from time $t_0$ (~0% full) through time $t_1$ (~38% full), but is relatively constant and does not increase from time $t_1$ to time $t_2$ (~50% full). From time $t_2$ to time $t_3$ (68% full), time $t_3$ to time $t_4$ (~100% full), and time $t_3$ to time $t_4$ (~100% full, the FLI output again increases linearly and consistently. These example results demonstrate that the FLI output is inconsistent within the range of ~38% full to ~50% full while the fill level is increasing, and within the range of ~25% full to ~38% full while the fill level is decreasing. In this example scenario, FLI degradation is most likely due to mechanical degradation, as the inconsistency in FLI output is asymmetrical.

Using such a dual diagnostic approach may allow for the discernment of electrical and mechanical degradation of a mechanical fuel level indicator. Further, if a range of FLI output is repeatedly inconsistent, such as in the example depicted in FIG. 5A, active measures may be taken to infer the fuel level within that range, so that an in-dash fuel level gauge may present an accurate estimate of fuel level across the entire fill level range.

Figure 6:
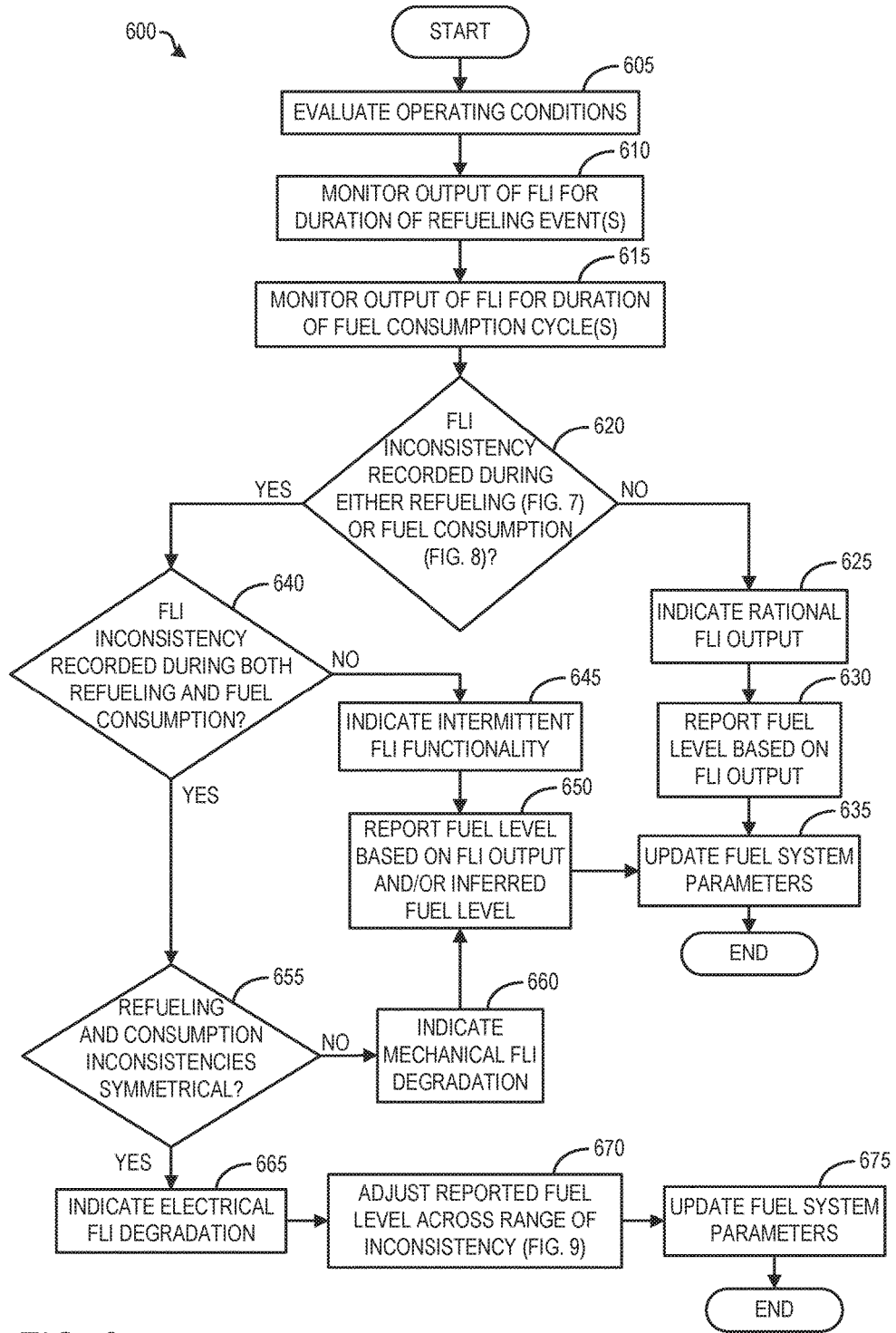
FIG. 6 depicts a flow chart for a high level method for diagnosing and mitigating fuel level indicator inconsistencies.
Figure 9:
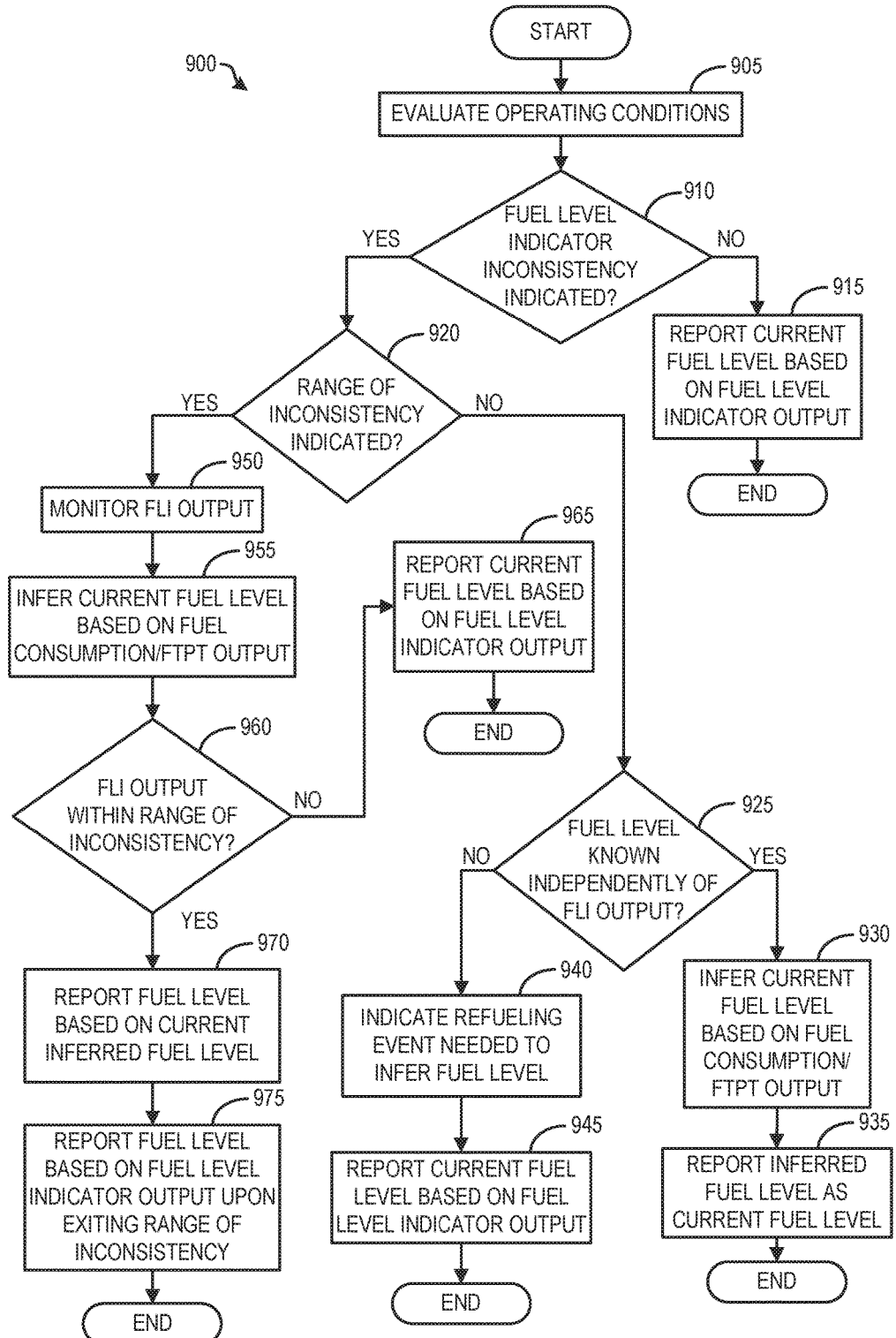
FIG. 9 depicts a flow chart for a high level method for mitigating fuel level indicator inconsistencies.

FIG. 6 depicts a flow chart for a high level method 600 for determining the functionality of a mechanical fuel level indicator. Instructions for carrying out method 600 and other methods included herein may be executed by a controller based on instructions stored in non-transitory memory of the controller, and in conjunction with signals received from sensors of the fuel system, such as the sensors described above with reference to FIGS. 1, 2, and 4. The controller may employ actuators of the fuel system to adjust fuel system operation, according to the methods described below. While described with reference to the systems depicted in FIGS. 1, 2, and 4, it should be understood that method 600 or similar methods may be applied to other systems without departing from the scope of this disclosure. FIGS. 7-9 depict methods that are related to method 600. Each of the methods presented herein are described in the context of a vehicle comprising a single fuel tank having a single, mechanical fuel level indicator, such as FLI 400. However, similar methods may be applied to systems comprising multiple fuel tanks, bifurcated, saddled, or otherwise chambered fuel tanks, as well as other systems where two or more fuel level indicators are included without departing from the scope of this disclosure.

Method 600 begins at 605, and includes evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors coupled to a controller, or may be estimated or inferred based on available data.

Continuing at 610, method 600 includes monitoring the output of a fuel level indicator for the duration of one or more refueling events. For example, the output of an FLI, such as FLI 234 or FLI 400 may be monitored, recorded, and/or stored at a controller. As described further with regard to FIG. 7, the FLI output may be compared to the output of one or more additional sensors, such as a fuel tank pressure sensor, to determine an expected FLI output during the refueling event. Depending on the initial amount of fuel stored in the fuel tank at the outset of the refueling event, as well as the amount of fuel added during the refueling event, two or more refueling events may be monitored in this way to ensure that the entire range of FLI output has been monitored one or more times as the fuel level is increasing.

Continuing at 615, method 600 includes monitoring the output of the FLI for the duration of one or more fuel consumption cycles, which may include recording and storing FLI output data at a controller. As described further with regard to FIG. 8, the FLI output may be compared to an estimated FLI output, the estimated FLI output based on an amount of fuel consumed during a fuel consumption cycle. For example, fuel injector pulse widths may be summed over time to determine an amount of fuel withdrawn from the fuel tank during engine combustion. Depending on the initial amount of fuel stored in the fuel tank at the outset of the fuel consumption cycle, as well as the amount of fuel consumed prior to a refueling event, two or more fuel consumption cycles may be monitored in this way to ensure that the entire range of FLI output has been monitored one or more times as the fuel level is decreasing. For hybrid vehicles and other vehicles that may operate for durations without consuming fuel, each fuel consumption cycle may encompass multiple vehicle drive cycles.

Continuing at 620, method 600 includes determining whether an inconsistency in FLI output was recorded during either a refueling event or a fuel consumption cycle. A more detailed method for determining FLI inconsistency during refueling is presented herein and with regard to FIG. 7. Briefly, it may be determined whether the FLI output failed to increase linearly during a portion of the refueling event where fuel was inferred to be added to the fuel tank at a constant rate (e.g., steady-state portion of refueling event). The example FLI output curves in FIGS. 5A and 5B each show such an inconsistency. A more detailed method for determining FLI inconsistency during fuel consumption is presented herein and with regard to FIG. 8. Briefly, it may be determined whether the FLI output failed to decrease linearly during a portion of the fuel consumption cycle where fuel was inferred to be removed from the fuel tank at a constant rate. The example FLI output curves in FIGS. 5A and 5B each show such an inconsistency.

If no inconsistencies are recorded during either of a refueling event or a fuel consumption cycle across the output range of the FLI (or within a non-zero threshold of the range, for example a range of FLI output extending from 100% filled to a predetermined value greater than 0% filled), method 600 proceeds to 625. At 625, method 600 includes indicating that the FLI output is rational. Indicating that the FLI output is rational may include recording the results of FLI monitoring at a vehicle controller. Continuing at 630, method 600 includes reporting fuel level based on the FLI output. For example, an in-dash fuel level gauge may report a fuel tank fill level based on the FLI output. Further, parameters that are dependent on the FLI, such as miles-to-empty, low-fuel indicators, etc., may be indicated based on the output of the FLI. Continuing at 635, method 600 includes updating fuel system parameters. For example, FLI rationality testing schedules may be updated, such as by resetting a rationality testing schedule counter, such that a next FLI rationality test occurs at a later time point than would otherwise be scheduled. Testing schedules, such as evaporative emissions tests, that are dependent on fuel tank fill level may be updated. As an example, entry conditions for an evaporative emissions test that require a fuel tank fill level to be within a range of fill levels may be updated to reflect that the FLI output is rational. Fuel consumption parameters, such as desired A/F ratio, may be updated based on the FLI output being rational. For example, fuel saving parameters that were applied based on an uncertainty in the FLI output may be removed. Method 600 may then end.

Returning to 620, if an inconsistency was recorded during a refueling event or a fuel consumption cycle, method 600 then proceeds to 640. At 640, method 600 includes determining whether an inconsistency in FLI output was recorded during both a refueling event and a fuel consumption cycle. As such, if FLI inconsistency is recorded during one of refueling or fuel consumption, but not during both refueling and fuel consumption, method 600 proceeds to 645. At 645, method 600 includes indicating intermittent FLI functionality. Intermittent FLI functionality may be indicative of relatively minor electrical or mechanical degradation that disrupts FLI functionality responsive to external factors. For example, loose wiring may affect the output of an FLI when the vehicle is traversing uneven surfaces, thus causing the FLI output to be inconsistent at points during fuel consumption, but not when the vehicle is stationary during a refueling event. Indicating intermittent FLI functionality may include recording intermittent FLI functionality at the vehicle controller. In some examples, a malfunction indicator light (MIL) may be illuminated, and/or the vehicle operator otherwise alerted that the FLI has intermittent functionality.

Continuing at 650, method 600 includes reporting a current fuel level based on an FLI output and/or an inferred fuel level. For example, the current fuel level may be indicated based on the FLI output when the measured fuel level is within a non-zero threshold of the inferred fuel level. Method 600 may further include indicating a current fuel level based on the inferred fuel level when the measured fuel level is not within a non-zero threshold of the inferred fuel level. For example, during a fuel consumption cycle, the vehicle controller may monitor the FLI output and compare the FLI output to an inferred fuel level based on an amount of fuel consumed subsequent to a time point where the FLI output was indicated to be an accurate representation of the amount of fuel within the fuel tank. During a refueling event, the FLI output may be compared to an inferred fuel level based on a residual fuel level at the initiation of the refueling event, and further based on a rate of fuel delivery in to the fuel tank. In either scenario, if the inferred fuel level is within a non-zero threshold of the measured fuel level based on the FLI output, the fuel level may be indicated based on the FLI output. If the inferred fuel level is more than a non-zero threshold away from the measured fuel level based on the FLI output, the fuel level may be indicated based on the inferred fuel level, and not based on the FLI output.

Method 600 then proceeds to 635, and includes updating fuel system parameters. For example, FLI rationality testing schedules may be updated to increase the frequency of testing, and/or to determine the cause of the intermittent functionality. Downstream parameters such as miles-to-empty, low-fuel indicators, and entry conditions and/or thresholds for evaporative emissions tests may be adjusted such that the parameters are determined based on the FLI output when the fuel level is indicated based on the FLI output, and such that the parameters are determined based on the inferred fuel level when the fuel level is indicated based on the inferred fuel level. Method 600 may then end.

Returning to 640, if FLI inconsistency is recorded during both refueling and fuel consumption, method 600 then proceeds to 655. At 655, method 600 includes determining whether inconsistencies in FLI output during refueling and fuel consumption are symmetrical, such as the inconsistencies shown in FIG. 5A, or asymmetrical, such as the inconsistencies shown in FIG. 5B. If the inconsistencies are not symmetrical (e.g., the inconsistencies were recorded at differing fuel level ranges), method 600 proceeds to 660 and includes indicating mechanical FLI degradation. For example, mechanical FLI degradation may include a bent float arm, a leaky float, a loose mechanical element (e.g., a screw or bolt), a physical impediment in the float arm trajectory, etc. Indicating mechanical FLI degradation may include recording the inconsistent test results at the vehicle controller, illuminating an MIL and/or otherwise indicating the inconsistency to the vehicle operator. The ranges of FLI inconsistency may be recorded at the FLI controller.

Method 600 then proceeds to 650, and includes indicating the fuel level based on the FLI output and/or an inferred fuel level. As described above, this may include indicating the fuel level based on the FLI output when the measured fuel level is within a non-zero threshold of an inferred fuel level, and indicating the fuel level based on the inferred fuel level when the measured fuel level is not within a non-zero threshold of the inferred fuel level. In some examples, the inconsistencies during fuel consumption cycles and/or during refueling events may be consistent and repeatable, albeit asymmetric. In such a scenario, the indicated fuel level may be adjusted across the determined range of inconsistency, as described further herein and with regard to FIG. 9. Method 600 then proceeds to 635, and includes updating fuel system parameters as described above.

Returning to 655, if the inconsistencies are symmetrical (e.g., the inconsistencies were recorded at similar fuel level ranges), method 600 proceeds to 665 and includes indicating electrical FLI degradation. For example, electrical FLI degradation may comprise a worn potentiometer resistive track. Indicating electrical FLI degradation may include recording the inconsistent test results at the vehicle controller, illuminating an MIL and/or otherwise indicating the inconsistency to the vehicle operator. The range of FLI inconsistency may be recorded at the FLI controller. It should be noted that scenarios may arise where the FLI has both electrical degradation and mechanical degradation (e.g., both resistive track wear and a bent float arm). In such an example, each range of inconsistent FLI output may be subject to analysis independently, such that ranges that produce inconsistencies during both refueling and fuel consumption are treated as electrical degradation, while ranges that produce inconsistencies during one of refueling and fuel consumption are treated as mechanical degradation.

Upon indicating electrical FLI degradation, method 600 proceeds to 670, and includes adjusting the reported fuel level across the inconsistent range(s). A method for adjusting the reported fuel level as such is described further herein and with regard to FIG. 9. Briefly, the fuel level may be reported based on the FLI output when the FLI output is outside an inconsistent range, and reported based on an inferred fuel level when the FLI output is within the inconsistent range. Method 600 then proceeds to 675, and includes updating fuel system parameters. For example, parameters based on fuel fill level may be adjusted based on the current indicated fill level, and/or based on the inferred fuel level but not the FLI output when the FLI output is within the inconsistent range. Fuel injection parameters may be updated so that the total fuel consumed during a vehicle drive cycle may be determined with a threshold degree of certainty. Method 600 may then end.

FIG. 7 depicts a flow chart for a high level method 700 for determining the functionality of a mechanical fuel level indicator during a refueling event. While described with reference to the systems depicted in FIGS. 1, 2, and 4, it should be understood that method 700 or similar methods may be applied to other systems without departing from the scope of this disclosure. In some examples, method 700 may be performed in response to an indication of FLI inconsistency, such as an inconsistency determined during a fuel consumption cycle and/or during a prior refueling event.

Method 700 begins at 705 by evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors coupled to a controller, or may be estimated or inferred based on available data.

Continuing at 710, method 700 may include determining whether a refueling event has been requested. For example, vehicle propulsion system 100 comprises a refueling button 197 located on the vehicle dashboard. Detecting depression of a refueling request button may indicate that a refueling event has been requested. In other examples, a refueling event request may be inferred by the vehicle operator (or a refueling attendant) opening a refueling door or otherwise attempting to gain access to the vehicle's fuel filler system (e.g., fuel filler system 219). In some examples, determining whether a refueling event has been requested may include detecting proximity to a refueling station. For example, the vehicle's proximity to a refueling station may be determined via an on-board GPS or through wireless communication between the vehicle and a refueling pump.

If no request for a refueling event has been received, method 700 may proceed to 715. At 715, method 700 includes maintaining the status of the fuel system. For example, fuel system actuators, such as valves, pumps, etc. may be maintained in their current conformations, and/or control of such actuators may be maintained according to current methods, operating conditions, etc. For example, a fuel tank isolation valve may be maintained closed, subject to current parameters that regulate fuel tank pressure and fuel vapor venting.

Continuing at 720, method 700 includes maintaining the current state of FLI monitoring. As described with regard to method 600, and as further described herein with regard to FIG. 8, the output of a vehicle fuel level indicator may be monitored for inconsistencies during one or more fuel consumption cycles. As such, if the FLI output is being monitored during a current fuel consumption cycle, method 700 may include continuing to monitor the FLI output for the duration of the current fuel consumption cycle. Further, the current parameters governing the indication of the fuel level, as described with regard to method 600, and as further described herein with regard to FIG. 9, may be maintained. For example, if the fuel level is currently indicated based on the FLI output, the fuel level may then continue to be indicated based on the FLI output. Method 700 may then end.

Returning to 710, if a request for a refueling event has been received, method 700 proceeds to 725. At 725, method 700 may include depressurizing the fuel tank. For example, a fuel tank, such as fuel tank 220, may be depressurized by opening an FTIV and venting fuel vapor to a fuel vapor canister. Upon the fuel tank pressure decreasing below a threshold (e.g., atmospheric pressure), method 700 proceeds to 730. At 730, method 700 includes allowing access to the fuel filler neck. For example, a controller may unlock a refueling lock, such as refueling lock 245, via a solenoid actuator coupled to a pin locking an access panel in the vehicle body. As described with regard to FIG. 2, refueling lock 245 may be a refueling door lock, a fuel cap lock, a filler pipe valve lock, etc.

Continuing at 735, method 700 includes maintaining the controller on for the duration of the refueling event. In some examples, the controller may be maintained on in a reduced power consumption mode, in contrast to a full power consumption mode utilized during vehicle operation. Maintaining the controller on may include maintaining power to sensors and actuators included in the refueling system. Method 700 further includes monitoring fuel tank pressure for the duration of the refueling event. For example, the output of an FTPT may be monitored, recorded, and/or stored at the vehicle controller. Method 700 further includes monitoring the output of the fill level indicator for the duration of the refueling event. For example, the output of an FLI may be monitored, recorded, and/or stored at the vehicle controller.

At the conclusion of the refueling event, method 700 proceeds to 740. At 740, method 700 includes determining whether the output of the FLI increased linearly and continuously during the steady-state portion of the refueling event. As described with regard to FIG. 3A, the steady-state portion of the refueling event may be indicated based on the fuel tank pressure profile during the refueling event. While the fuel tank pressure is relatively constant, following an initial pressure spike, it may be inferred that fuel is being added to the fuel tank at a constant rate, and thus the actual fuel fill level may be expected to increase linearly and continuously, as shown in FIG. 3B. The total fuel fill level may be inferred based on an amount of fuel added to the fuel tank during the refueling event, along with the residual amount of fuel in the fuel tank at the initiation of the refueling event. The residual amount of fuel may be inferred based on the FLI output, the initial pressure spike during refueling, an amount of fuel consumed following a known (or inferred) fuel level, etc.

If the output of the FLI did not increase linearly and continuously during the steady-state portion of the refueling event, method 700 then proceeds to 745. At 745, method 700 includes indicating an FLI profile inconsistency. For example, the occurrence of the inconsistency may be stored at the vehicle controller, as may the range of fuel level and/or FLI output which is inconsistent. In some examples, an MIL may be illuminated, and/or the vehicle operator otherwise notified of the inconsistency. Continuing at 750, method 700 includes updating fuel system parameters. For example, additional FLI testing may be scheduled for one or more subsequent refueling events and/or for one or more subsequent fuel consumption cycles. The cause of the FLI inconsistency may be determined (e.g., via method 600), and/or parameters for the indicated fuel level may be updated, as described with regard to FIG. 6, and as further described herein with regard to FIG. 9. Fuel consumption parameters, such as desired A/F ratio, may be updated based on the FLI output being inconsistent. For example, fuel saving parameters may be applied based on the uncertainty in the FLI output. Method 700 may then end.

Returning to 740, if the output of the FLI did increase linearly and continuously during the steady-state portion of the refueling event, method 700 then proceeds to 755. At 755, method 700 includes indicating that the FLI profile during the refueling event is consistent with the fuel tank pressure profile during the refueling event, and thus consistent with an expected FLI profile. The results of the FLI consistency test may be recorded at the vehicle controller. Continuing at 760, method 700 includes determining whether the refueling quantity is greater than a non-zero threshold. In other words, method 700 may determine whether a range of FLI output was encompassed during the refueling event. For example, if an FLI output inconsistency was indicated during a fuel consumption cycle, and/or during a prior refueling event, it may be determined whether the range of the inconsistency was traversed by the FLI during the refueling event. In some examples, the range of the FLI output may be compared to that for previous refueling events to determine if the entire range of the FLI output has been monitored during one or more refueling events.

If the refueling quantity is greater than the non-zero threshold (e.g., the FLI output range has been sufficiently monitored), method 700 proceeds to 765. At 765, method 700 includes indicating that the FLI output during refueling is consistent with the expected FLI output, and may further include updating fuel system parameters to indicate that the current FLI output is reflective of the current fuel fill level, as described with regard to FIG. 6. Method 700 may then end. If the refueling quantity is less than the non-zero threshold (e.g., portion(s) of the FLI output range have not been sufficiently monitored), method 700 proceeds to 770. At 770, method 700 includes indicating further FLI output monitoring. For example, the range of FLI output that remains to be monitored may be recorded at the vehicle controller, and subsequent FLI monitoring scheduled accordingly. In some examples, the vehicle operator may be notified that a particular range of FLI output needs to be monitored. For example, the vehicle human-machine interface may indicate to the vehicle operator to fill the fuel tank to the fill level limit at a subsequent refueling event. Additionally or alternatively, the vehicle human-machine interface may indicate to the vehicle operator not to refuel until the fuel fill level decreases below a non-zero threshold representing a lower limit of the range of FLI output that remains to be monitored. Method 700 may then end.

FIG. 8 depicts a flow chart for a high level method 800 for determining the functionality of a mechanical fuel level indicator during a fuel consumption cycle. While described with reference to the systems depicted in FIGS. 1, 2, and 4, it should be understood that method 800 or similar methods may be applied to other systems without departing from the scope of this disclosure. In some examples, method 800 may be initiated in response to an indication of FLI inconsistency, such as an inconsistency determined during a fuel consumption cycle and/or during a prior refueling event.

Method 800 begins at 805 by evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors coupled to a controller, or may be estimated or inferred based on available data.

Continuing at 810, method 800 may include determining whether the fuel level is known and/or able to be inferred with a threshold degree of certainty independently from the current FLI output. The threshold degree of certainty may comprise a non-zero likelihood that a inferred fuel level is equal to the actual fuel level, and/or within a non-zero threshold quantity of the actual fuel level. As an example, an automatic shut-off event at the end of a most recent refueling event may indicate a fill level of 100%. In some examples, the fuel level may be inferred based on fuel tank pressure, fuel composition, fuel temperature, and/or other fuel system parameters. If the current fuel fill level is not able to be inferred independently from the FLI output, method 800 may proceed to 815. At 815, method 800 includes indicating that a refueling event is needed to assess FLI consistency. For example, a flag may be set at a vehicle controller to monitor a subsequent refueling event to generate an estimated fuel tank fill level. In some examples, the refueling event may include an automatic shut-off event due to the fuel level reaching a maximum fill level, thereby enabling the FLI output to be monitored from the maximum fill level. In some examples, a refueling event that is electively terminated by the refueling operator may be sufficient to infer a fuel tank fill level within the threshold certainty, for example by estimating a residual fuel level and an amount of fuel added based on the fuel tank pressure profile during the refueling event.

Continuing at 820, method 800 includes maintaining the current state of FLI monitoring. As such, if the FLI output is being monitored during a current fuel consumption cycle, even if the fuel level is not empirically known independently of the FLI output, method 800 may include continuing to monitor the FLI output for the duration of the current fuel consumption cycle. Further, the current parameters governing the indication of the fuel level, as described with regard to method 600, and as further described herein with regard to FIG. 9, may be maintained. For example, if the fuel level is currently indicated based on the FLI output, the fuel level may then continue to be indicated based on the FLI output. Method 800 may then end.

Returning to 810, if the fuel level is known independently of the FLI output, method 800 then proceeds to 825. At 825, method 800 includes monitoring the output of the FLI for the duration of the current fuel consumption cycle. For example, the output of the FLI may be recorded and stored at the vehicle controller. For hybrid vehicles, stop/start vehicles, and other vehicles configured to operate for durations without consuming fuel, the FLI output may be monitored during periods of fuel consumption and/or during periods of vehicle operation without fuel consumption. A fuel consumption cycle may encompass a plurality of vehicle on/off events, and may be considered to be ended upon detection of a refueling event.

Continuing at 830, method 800 includes smoothing the recorded FLI output over time. While the vehicle is operating, whether or not fuel is being consumed, the FLI output may fluctuate due to fuel sloshing, road grade, etc. As such, the FLI output may be transformed to limit the degree of fluctuation due to vehicle movement. For example, the FLI output during periods of vehicle operation without fuel consumption may be used to transform the FLI output during periods of fuel consumption. Increases in fuel tank pressure above a threshold (e.g., a non-zero value above a current fuel tank pressure and/or a threshold rate of increase in fuel tank pressure) may be indicative of fuel sloshing events, while vehicle sensors such as barometers, accelerometers, etc. may be used to indicate changes in road grade which may affect the FLI output. Such events may be smoothed, removed, or otherwise denoted within the recorded FLI output.

Continuing at 835, method 800 includes inferring the current fuel level based on fuel consumption. For example, the amount of fuel consumed by the vehicle, and thus extracted from the fuel tank may be determined by summing pulse-widths of engine fuel injectors. The amount of fuel consumed may additionally or alternatively be based on intake mass air flow and the output of one or more air/fuel ratio sensors. The amount of fuel consumed may then be subtracted from the initial known fuel level (as described at 810) in order to infer the current fuel level. In other examples, the current fuel level may be inferred based on fuel tank pressure, weight, and/or other measurable fuel system parameters.

Continuing at 840, method 800 includes receiving an indication of an end of the current fuel consumption cycle. As described above, the end of a current fuel consumption cycle may be indicated by the initiation of a refueling event. For example, the receipt of a request for a refueling event may mark the end of a fuel consumption cycle. In some examples, the end of a fuel consumption cycle may be indicated responsive to the recognition of a fuel dispenser nozzle entering a fuel filler neck, and/or an indication that fuel is being added (or removed) to the fuel tank.

Continuing at 845, method 800 includes determining whether the smoothed output of the FLI is within a non-zero threshold of the inferred fuel level during the fuel consumption cycle. In other words, method 800 includes determining whether the reported fuel level is within a non-zero threshold of the expected fuel level, once noise and other confounding factors have been removed from the reported fuel level. The threshold may be predetermined, and/or based on operating conditions. In some examples, an absolute threshold is applied both above and below the expected fuel level; however, two unique thresholds may also be used. In some examples, the threshold may be constant across the range of fuel fill levels; however, such a threshold may additionally or alternatively be based on the reported and/or expected fuel fill level. For example, the threshold difference may be smaller in critical ranges approaching empty and/or approaching a threshold for indicating a low fuel level to the vehicle operator. As the FLI output may fluctuate even after smoothing, determining whether the reported fuel level is within a threshold of the expected fuel level may include determining whether the reported fuel level is not within a threshold of the expected fuel level for a non-zero threshold duration. Such a threshold duration may be normalized based on fuel consumed over the duration.

If the smoothed output of the FLI is not within a non-zero threshold of the inferred fuel level during the fuel consumption cycle, method 800 then proceeds to 850. At 850, method 800 includes indicating an FLI profile inconsistency. For example, the occurrence of the inconsistency may be stored at the vehicle controller, as may the range(s) of fuel levels and/or FLI output which are inconsistent. In some examples, an MIL may be illuminated, and/or the vehicle operator otherwise notified of the inconsistency. Continuing at 855, method 800 includes updating fuel system parameters. For example, additional FLI testing may be scheduled for one or more subsequent refueling events and/or for one or more subsequent fuel consumption cycles. The cause of the FLI inconsistency may be determined (e.g., via method 600), and/or parameters for the indicated fuel level may be updated, as described with regard to FIG. 6, and as further described herein with regard to FIG. 9. Fuel consumption parameters, such as desired A/F ratio, may be updated based on the FLI output being inconsistent. For example, fuel saving parameters may be applied based on the uncertainty in the FLI output. Method 800 may then end.

Returning to 845, if the smoothed output of the FLI is within a non-zero threshold of the inferred fuel level for the entirety of the fuel consumption cycle, method 800 then proceeds to 860. At 860, method 800 includes indicating that the reported fuel level indicator profile is consistent with the fuel consumption profile during the fuel consumption cycle, and thus consistent with an expected FLI profile. The results of the FLI consistency test may be recorded at the vehicle controller. Continuing at 865, method 800 includes determining whether the consumed quantity of fuel is greater than a non-zero threshold. In other words, method 800 may determine whether a range of FLI output was encompassed during the refueling event. For example, if an FLI output inconsistency was indicated during a prior fuel consumption cycle, and/or during a prior refueling event, it may be determined whether the range of the inconsistency was traversed by the FLI during the fuel consumption cycle. In some examples, the range of the FLI output may be compared to that for previous fuel consumption cycles to determine if the entire range of the FLI output has been monitored during one or more fuel consumption cycles.

If the quantity of fuel consumed is greater than the non-zero threshold (e.g., the FLI output range has been sufficiently monitored), method 800 proceeds to 870. At 870, method 800 includes indicating that the FLI output during fuel consumption is consistent with the expected FLI output, and may further include updating fuel system parameters to indicate that the current FLI output is reflective of the current fuel fill level, as described with regard to FIG. 6. Method 800 may then end. If the quantity of fuel consumed is less than the non-zero threshold (e.g., portion(s) of the FLI output range have not been sufficiently monitored), method 800 proceeds to 875. At 875, method 800 includes indicating further FLI output monitoring. For example, the range of FLI output that remains to be monitored may be recorded at the vehicle controller, and subsequent FLI monitoring scheduled accordingly. In some examples, the vehicle operator may be notified that a particular range of FLI output needs to be monitored. For example, the vehicle human-machine interface may indicate to the vehicle operator to fill the fuel tank to the fill level limit at a subsequent refueling event. Additionally or alternatively, the vehicle human-machine interface may indicate to the vehicle operator not to refuel until the fuel fill level decreases below a non-zero threshold. Method 800 may then end.

FIG. 9 depicts a flow chart for a high level method 900 for indicating a current fuel level despite an inconsistent fuel level indicator. While described with reference to the systems depicted in FIGS. 1, 2, and 4, it should be understood that method 900 or similar methods may be applied to other systems without departing from the scope of this disclosure. In some examples, method 900 may be initiated in response to an indication of FLI inconsistency, such as an inconsistency determined during a fuel consumption cycle and/or during a prior refueling event.

Method 900 begins at 905 by evaluating operating conditions. Operating conditions may comprise one or more vehicle conditions, one or more engine conditions, and/or one or more fuel system conditions. For example, operating conditions may include, but are not limited to, fuel tank pressure, fuel tank fill level, ambient temperature, engine operating status, vehicle location (as determined through an on-board GPS, for example), etc. Operating conditions may be measured by one or more sensors coupled to a controller, or may be estimated or inferred based on available data.

At 910, method 900 includes determining whether a fuel level indicator inconsistency is indicated. As described with regard to FIGS. 6-8, fuel level indicator inconsistency may be determined during a fuel consumption cycle and/or during a refueling event. Determining whether a fuel level indicator inconsistency is indicated may include retrieving test results, diagnostic codes, flags, etc. from a vehicle controller. In some examples, a fuel level indicator inconsistency may be indicated responsive to a single recorded inconsistency. In other examples, a fuel level indicator inconsistency may be indicated following repeated recorded inconsistencies, either recorded during multiple fuel consumption cycles and/or multiple refueling events, or recorded during sequential fuel consumption cycles and refueling events. If no FLI inconsistency is indicated, method 900 proceeds to 915, and includes reporting the current fuel level based on the fuel level indicator output. For example, an in-dash fuel level gauge may report a current fuel level to the vehicle operator as determined via the output of the fuel level indicator. In some examples, the output of the fuel level indicator may be transformed or smoothed, as described with regard to FIG. 8, prior to a current fuel level being reported. In some examples, the fuel level may be indicated based on the FLI output concurrent with ongoing FLI consistency tests and/or when additional FLI consistency tests are pending following an initial indication of FLI inconsistency. Method 900 may then end.

If a fuel level indicator inconsistency is indicated, method 900 proceeds to 920. At 920, method 900 includes determining whether a range of FLI inconsistency is indicated. Determining whether a range of FLI inconsistency is indicated may include retrieving test results, diagnostic codes, flags, etc. from a vehicle controller. As described with regard to FIGS. 5A-5B, and FIGS. 6-8, electrical FLI degradation, such as a worn resistive track, may result in repeated indications of FLI inconsistency across a range of FLI output, such as that corresponding to the size and relative location of the wear. An indicated range of FLI inconsistency may include ranges of FLI output adjacent to determined inconsistent values. If no range of FLI inconsistency has been indicated, method 900 proceeds to 925. At 925, method 900 includes determining whether the current fuel level is known independently of the FLI output. As described with regard to FIGS. 3A and 8, the fuel level may be determined during a refueling event based on the fuel tank pressure profile. When the fuel level is inferred in this fashion, the vehicle controller may then quantify fuel consumed since the refueling event, and thus infer a current fuel fill level. This data may be retrieved from the vehicle controller. In some examples, determining whether a current fuel level is known independently of the FLI output may include determining a confidence in a current inferred fuel level, and may further include determining whether such a confidence is greater than a non-zero threshold confidence.

If the current fuel level is known independently of the FLI output, method 900 proceeds to 930. At 930, method 900 includes inferring the current fuel level based on fuel consumption and/or an FTPT output. During a fuel consumption cycle, the amount of fuel consumed may be summed and subtracted from the last known fuel level (e.g., at the end of a most recent refueling event). During a refueling event, the residual amount of fuel remaining in the fuel tank may be inferred based on an initial pressure change upon initiation of refueling, and the amount of fuel added to the fuel tank may be inferred based on a steady-state fuel tank pressure (FTPT output) during the refueling event, and then added to the residual amount of fuel. Fuel added during trickle-filling events following an automatic shutoff of a refueling dispenser may be estimated and added to the residual amount of fuel and steady-state amount of fuel added. As additional information becomes available, the model used to infer fuel level may be adjusted and/or calibrated accordingly.

Continuing at 935, method 900 includes reporting the inferred fuel level. For example, the inferred fuel level may be stored at the vehicle controller, presented on an in-dash fuel level gauge, and/or conveyed to the vehicle operator using alternate means via the vehicle human-machine interface. Reporting the inferred fuel level may include not reporting a fuel level based on the FLI output. Downstream calculations, such as miles-to-empty, thresholds for indicating a low-fuel level, entry conditions and parameters for undesired evaporative emissions tests, etc. may utilize the inferred fuel level, and may not utilize the FLI output or a fuel level based on the FLI output. Method 900 may then end.

Returning to 925, if the fuel level is not known independently of the FLI output, method 900 then proceeds to 940, and includes indicating that a refueling event is needed to infer a current fuel level. As described with regard to FIG. 8, indicating that a refueling event is needed to infer a current fuel level may include setting a flag at the vehicle controller, and may further comprise indicating to the vehicle operator to refuel the vehicle. In some examples, the indication that a refueling event is needed may include an indication that a full fuel tank is needed to infer the current fuel level. Continuing at 945, method 900 includes indicating the fuel level as reported by the fuel level indicator, as described at 915. Method 900 may then end.

Returning to 920, if a range of FLI inconsistency is indicated, method 900 then proceeds to 950. At 950, method 900 includes monitoring the output of the FLI. As described with regard to FIG. 7, the output of the FLI may be monitored for the duration of a refueling event, and as described with regard to FIG. 8, the output of the FLI may be monitored for the duration of a fuel consumption cycle. The output of the FLI may be recorded at the vehicle controller. Continuing at 955, method 900 includes inferring the current fuel level based on fuel consumption and/or based on an output of an FTPT, as described at 930.

At 960, method 900 includes determining whether the FLI output is within the range of inconsistency indicated at 920. If the FLI output is not within the range of inconsistency (e.g., the FLI output is within a range wherein the current fuel level is accurately represented), method 900 proceeds to 965, and includes reporting the fuel level based on the FLI output, as described at 915. Method 900 may then end.

If the FLI output is within the range of inconsistency (e.g., the FLI output is considered unreliable and/or approaching an unreliable range), method 900 proceeds to 970. At 970, method 900 includes reporting the inferred fuel level, as described at 935. Continuing at 975, method 900 includes reporting the fuel level based on the FLI output upon exiting the range of inconsistency. In other words, the current fuel level is reported based on the FLI output when the FLI output is outside the indicated range of inconsistency, and reported based on the inferred fuel level when the FLI output is within the indicated range of inconsistency. Method 900 may then end.

FIG. 10 depicts an example timeline 1000 for operating a fuel system according to the methods described herein and with regard to FIGS. 6-9. Timeline 1000 includes plot 1010, indicating fuel tank fill level based on the output of a fuel level indicator; and plot 1020, indicating an inferred fuel tank fill level. Plot 1010 (solid line) and plot 1020 (dashed line) are co-plotted in order to show inconsistencies between the two plots. Line 1024 and line 1028 represent an upper limit and lower limit of an inconsistency range, respectively. Timeline 1000 further includes plot 1030, indicating whether a reported fuel fill level (e.g., displayed on an in-dash fuel level gauge) is based on the FLI output or the inferred fill level over time. Timeline 1000 further includes plot 1040, indicating whether a refueling event has been requested over time; plot 1050, indicating whether FLI inconsistency is indicated over time; and plot 1060, indicating whether a range of FLI inconsistency is indicated over time.

At time $t_0$, the FLI based fuel tank fill level and the inferred fuel tank fill level both indicate a full fuel tank, as shown by plots 1010 and 1020, respectively. No FLI inconsistency is indicated, as shown by plot 1050, and thus the fill level is reported based on the FLI output, as shown by plot 1030. At time $t_1$, a fuel consumption cycle is initiated. Both the FLI based fuel tank fill level and the inferred fuel tank fill level decrease, and the FLI based fill level remains within a threshold of the inferred fuel tank fill level. At time $t_2$, the vehicle is operated without fuel consumption, and thus the FLI based fill level and the inferred fuel tank fill level are maintained at a relatively constant level. Fuel consumption resumes at time $t_3$, and both the FLI based fuel tank fill level and the inferred fuel tank fill level decrease, and the FLI based fill level remains within a threshold of the inferred fuel tank fill level until time $t_4$. From time $t_4$ to time $t_5$, the FLI based fuel tank fill fuel level deviates from the inferred fuel tank fill level. Accordingly, an FLI inconsistency is indicated, as shown by plot 1050. A preliminary FLI inconsistency range is recorded, represented herein by lines 1024 and 1028. However, in lieu of conformation during a refueling event, an FLI inconsistency range is not indicated, as shown by plot 1060.

From time $t_5$ to time $t_6$, the FLI based fuel tank fill level returns to a value within a threshold of the inferred fuel tank fill level. At time $t_6$, a refueling event is requested, as indicated by plot 1040, thus ending the current fuel consumption cycle that began at time $t_1$. Subsequently, at time $t_7$, both the FLI based fuel tank fill level and the inferred fuel tank fill level increase. The FLI based fuel tank fill level is maintained within a threshold of the inferred fuel tank fill level until time $t_8$, when the FLI based fuel tank fill level again deviates from the inferred fuel tank fill level, until returning to within a threshold at time $t_9$. The range of fuel tank fill level where the deviation occurred during refueling comprises the same range where a deviation occurred during fuel consumption. Accordingly, a range of FLI inconsistency is indicated.

Refueling continues from time $t_9$ to time $t_{10}$, and the FLI based fill level is within a threshold of the inferred fuel tank fill level. At time $t_{10}$, the refueling event is finalized, and a new fuel consumption cycle begins. From time $t_{10}$ to time $t_{11}$, both the FLI based fuel tank fill level and the inferred fuel tank fill level decrease, and the FLI based fill level remains within a threshold of the inferred fuel tank fill level. As the FLI based fuel tank fill level is outside the inconsistency range represented by lines 1024 and 1028, the reported fuel tank fill level is maintained as the FLI based fuel tank fill level. At time $t_{11}$, the FLI based fuel tank fill level crosses the upper limit of the inconsistency range, and deviates from the inferred fuel tank fill level. Accordingly, the reported fuel tank fill level switches to the inferred fuel tank fill level. At time $t_{12}$, the FLI based fuel tank fill level decreases below the lower limit of the inconsistency range, and again is within a threshold of the inferred fuel tank fill level. Accordingly, the reported fuel tank fill level is returned to the FLI based fuel tank fill level.

The systems described herein and with reference to FIGS. 1, 2, and 4, along with the methods described herein and with reference to FIGS. 6-9 may enable one or more systems and one or more methods. In one example, a method for a fuel system is presented, comprising: receiving a first indication of inconsistency in a fuel level indicator output during a fuel consumption cycle; receiving a second indication of inconsistency in a fuel level indicator output during a refueling event; and indicating electrical degradation of the fuel level indicator responsive to the first and second indications of inconsistency comprising coincident ranges of inconsistency for the fuel level indicator output. In such an example, the method may additionally or alternatively comprise indicating mechanical degradation of the fuel level indicator responsive to the first and second indications of inconsistency comprising distinct ranges of inconsistency for the fuel level indicator output; and adjusting a vehicle operating parameter automatically via a controller communicating with an actuator in response to the determined degradation, the vehicle operating parameter including a displayed fuel level to a vehicle occupant.

In any of the preceding example methods for a fuel system, receiving an indication of inconsistency in a fuel level indicator output during a fuel consumption cycle may additionally or alternatively comprise receiving a fuel level indicator output for a duration of a fuel consumption cycle; generating a measured fuel tank fill level profile for the duration of the fuel consumption cycle; at an outset of the fuel consumption cycle, receiving an indication of an initial fuel tank fill level that is not dependent on a fuel level indicator output; generating an inferred fuel tank fill level profile for the duration of the fuel consumption cycle based on the initial fuel tank fill level and further based on a fuel consumption profile over the duration of the fuel consumption cycle; and indicating an indication of inconsistency in fuel level indicator output responsive to a measured fuel tank fill level being more than a threshold different from an inferred fuel tank fill level for a predetermined duration based on a comparison of the measured fuel tank fill level profile and the inferred fuel tank fill level profile. In any of the preceding example methods for a fuel system the indication of the initial fuel tank fill level may additionally or alternatively be based on a fuel tank pressure profile during a refueling event. In any of the preceding example methods for a fuel system, receiving an indication of inconsistency in a fuel level indicator output during a refueling event may additionally or alternatively comprise receiving a fuel level indicator output for a duration of a refueling event; generating a measured fuel tank fill level profile for the duration of the refueling event; generating an inferred fuel tank fill level profile for the duration of the refueling event based on an initial fuel tank fill level and further based on an amount of fuel added during the refueling event; and indicating an indication of inconsistency in fuel level indicator output responsive to a measured fuel tank fill level being more than a threshold different from an inferred fuel tank fill level for a predetermined duration based on a comparison of the measured fuel tank fill level profile and the inferred fuel tank fill level profile. In any of the preceding example methods for a fuel system, the initial fuel tank fill level and the amount of fuel added during the refueling event may additionally or alternatively be based on a fuel tank pressure transducer output during the refueling event. In any of the preceding example methods for a fuel system, the method may additionally or alternatively comprise receiving an indication of inconsistency in a fuel level indicator output during either, but not both of a fuel consumption cycle or a refueling event; and indicating intermittent degradation of the fuel level indicator output. In any of the preceding example methods for a fuel system, the method may additionally or alternatively comprise receiving a first indication of rationality for an entirety of a range of a fuel level indicator output during a fuel consumption cycle; receiving a second indication of rationality for the entirety of the range of the fuel level indicator output during a refueling event; and indicating that the fuel level indicator output is rational. In any of the preceding example methods for a fuel system, the method may additionally or alternatively comprise adjusting a reported fuel fill level responsive to receiving a fuel level indicator output within the coincident range of inconsistency comprised in the first and second indications of inconsistency.

In another example a method for a vehicle fuel system is presented, comprising: reporting a current fuel level based on an output of a fuel level indicator responsive to receiving a fuel level indicator output that is greater than a first threshold; reporting a current fuel level based on an inferred fuel tank fill level determined independently of the fuel level indicator output responsive to receiving an output of the fuel level indicator that is less than the first threshold, but greater than a second threshold, less than the first threshold; and reporting a current fuel level based on a fuel level indicator output responsive to receiving a fuel level indicator output that is less than the second threshold. In such an example, reporting a current fuel level comprises displaying a current fuel level on a fuel level gauge within a cabin of the vehicle. In any of the preceding example methods for a vehicle fuel system, the first threshold and second threshold may additionally or alternatively be based on a first range of inconsistency for the fuel level indicator determined during a fuel consumption cycle, and further based on a second range of inconsistency for the fuel level indicator determined during a refueling event, wherein the first range of inconsistency and second range of inconsistency comprise a coincident range of fuel level indicator output. In any of the preceding example methods for a vehicle fuel system, an inferred fuel tank fill level may additionally or alternatively be determined based on a fuel tank pressure profile during a refueling event, and may additionally or alternatively be based on a fuel consumption profile over a duration of a fuel consumption cycle initiated immediately following the refueling event. In any of the preceding example methods for a vehicle fuel system, the fuel consumption profile may additionally or alternatively be based on a summation of fuel injector pulse widths over time during the fuel consumption cycle. In any of the preceding example methods for a vehicle fuel system, the fuel system may additionally or alternatively be coupled to an engine, and the fuel consumption cycle may additionally or alternatively span two or more engine-off events. In any of the preceding example methods for a vehicle fuel system, the fuel consumption cycle may additionally or alternatively span two or more vehicle-off events. In any of the preceding example methods for a vehicle fuel system, the method may additionally or alternatively comprise receiving an indication that a fuel tank fill level cannot be determined independently of the fuel level indicator output; and indicating that a fuel tank fill level is to be determined following a refueling event.

In yet another example, a vehicle fuel system is presented, comprising a fuel tank; a mechanical fuel level indicator coupled within the fuel tank; a fuel tank pressure sensor coupled to the fuel tank; a fuel pump coupled within the fuel tank and configured to pump liquid fuel to one or more fuel injectors for a vehicle engine; an in-dash fuel level gauge configured to report a current fuel level to a vehicle operator; and a controller configured with instructions stored in non-transitory memory, that when executed, cause the controller to: indicate electrical degradation of the mechanical fuel level indicator responsive to receiving a first output of the mechanical fuel level indicator during upward travel and a second output of the mechanical fuel level indicator during downward travel, the first and second outputs of the mechanical fuel level indicator indicating a coincident range of inconsistency in the output of the mechanical fuel level indicator; report, via the in-dash fuel level gauge, a current fuel level that is not based on an output of the mechanical fuel level indicator when the output of the mechanical fuel level indicator is within the coincident range of inconsistency. In such an example vehicle fuel system, the current fuel level that is not based on the output of the mechanical fuel level indicator may additionally or alternatively be based on an output of the fuel tank pressure sensor during a refueling event, and further based on an amount of fuel delivered to the vehicle engine by the one or more fuel injectors during a fuel consumption cycle immediately following the refueling event. In any of the preceding example vehicle fuel systems, the controller may additionally or alternatively be configured with instructions stored in non-transitory memory, that when executed, cause the controller to: indicate mechanical degradation of the mechanical fuel level indicator responsive to receiving a first output of the mechanical fuel level indicator during upward travel and a second output of the mechanical fuel level indicator during downward travel, the first and second outputs of the mechanical fuel level indicator indicating distinct ranges of inconsistency in the output of the mechanical fuel level indicator.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a fuel system, comprising:
   receiving, at a controller, a first indication of inconsistency in a fuel level indicator output signal during a fuel consumption cycle;
   receiving, at the controller, a second indication of inconsistency in a fuel level indicator output signal during a refueling event; and
   indicating, via the controller, electrical degradation of the fuel level indicator responsive to the first and second indications of inconsistency comprising coincident ranges of inconsistency for the fuel level indicator output signal.

2. The method of claim 1, further comprising:
   indicating mechanical degradation of the fuel level indicator responsive to the first and second indications of inconsistency comprising distinct ranges of inconsistency for the fuel level indicator output; and
   adjusting a vehicle operating parameter automatically via the controller communicating with an actuator in response to the determined degradation, the vehicle operating parameter including a displayed fuel level to a vehicle occupant.

3. The method of claim 1, wherein receiving an indication of inconsistency in a fuel level indicator output during a fuel consumption cycle comprises:

receiving a fuel level indicator output for a duration of a fuel consumption cycle;

generating a measured fuel tank fill level profile for the duration of the fuel consumption cycle;

at an outset of the fuel consumption cycle, receiving an indication of an initial fuel tank fill level that is not dependent on a fuel level indicator output;

generating an inferred fuel tank fill level profile for the duration of the fuel consumption cycle based on the initial fuel tank fill level and further based on a fuel consumption profile over the duration of the fuel consumption cycle; and indicating an indication of inconsistency in fuel level indicator output responsive to a measured fuel tank fill level being more than a threshold different from an inferred fuel tank fill level for a predetermined duration based on a comparison of the measured fuel tank fill level profile and the inferred fuel tank fill level profile.

4. The method of claim 3, wherein the indication of the initial fuel tank fill level is based on a fuel tank pressure profile during a refueling event.

5. The method of claim 1, wherein receiving an indication of inconsistency in a fuel level indicator output during a refueling event comprises:

receiving a fuel level indicator output for a duration of a refueling event;

generating a measured fuel tank fill level profile for the duration of the refueling event;

generating an inferred fuel tank fill level profile for the duration of the refueling event based on an initial fuel tank fill level and further based on an amount of fuel added during the refueling event; and indicating an indication of inconsistency in fuel level indicator output responsive to a measured fuel tank fill level being more than a threshold different from an inferred fuel tank fill level for a predetermined duration based on a comparison of the measured fuel tank fill level profile and the inferred fuel tank fill level profile.

6. The method of claim 5, wherein the initial fuel tank fill level and the amount of fuel added during the refueling event are based on a fuel tank pressure transducer output during the refueling event.

7. The method of claim 1, further comprising:

receiving an indication of inconsistency in a fuel level indicator output during either, but not both of a fuel consumption cycle or a refueling event; and indicating intermittent degradation of the fuel level indicator output.

8. The method of claim 1, further comprising:

receiving a first indication of rationality for an entirety of a range of a fuel level indicator output during a fuel consumption cycle;

receiving a second indication of rationality for the entirety of the range of the fuel level indicator output during a refueling event; and indicating that the fuel level indicator output is rational.

9. The method of claim 1, further comprising:

adjusting a reported fuel fill level responsive to receiving a fuel level indicator output within the coincident range of inconsistency comprised in the first and second indications of inconsistency.

10. A method for a vehicle fuel system, comprising:

with a contoller, reporting a current fuel level based on an output of a fuel level indicator responsive to receiving at the contoller a fuel level indicator output that is greater than a first threshold;

with the controller, reporting a current fuel level based on an inferred fuel tank fill level determined by the controller independently of the fuel level indicator output responsive to receiving at the controller an output of the fuel level indicator that is less than the first threshold, but greater than a second threshold, less than the first threshold; and with the controller, reporting a current fuel level based on a fuel level indicator output responsive to receiving a fuel level indicator output that is less than the second threshold, wherein reporting current fuel level comprises displaying a current fuel level on a fuel level gauge within a cabin of the vehicle.

11. The method of claim 10, wherein the first threshold and second threshold are based on a first range of inconsistency for the fuel level indicator determined during a fuel consumption cycle, and further based on a second range of inconsistency for the fuel level indicator determined during a refueling event, wherein the first range of inconsistency and second range of inconsistency comprise a coincident range of fuel level indicator output.

12. The method of claim 10, wherein an inferred fuel tank fill level is determined based on a fuel tank pressure profile during a refueling event, and further based on a fuel consumption profile over a duration of a fuel consumption cycle initiated immediately following the refueling event.

13. The method of claim 12, wherein the fuel consumption profile is based on a summation of fuel injector pulse widths over time during the fuel consumption cycle.

14. The method of claim 12, wherein the fuel system is coupled to an engine, and wherein the fuel consumption cycle spans two or more engine-off events.

15. The method of claim 14, wherein the fuel consumption cycle spans two or more vehicle-off events.

16. The method of claim 10, further comprising:

receiving an indication that a fuel tank fill level cannot be determined independently of the fuel level indicator output; and indicating that a fuel tank fill level is to be determined following a refueling event.

17. A vehicle fuel system, comprising:

a fuel tank;

a mechanical fuel level indicator coupled within the fuel tank;

a fuel tank pressure sensor coupled to the fuel tank;

a fuel pump coupled within the fuel tank and configured to pump liquid fuel to one or more fuel injectors for a vehicle engine;

an in-dash fuel level gauge configured to report a current fuel level to a vehicle operator; and a controller configured with instructions stored in non-transitory memory, that when executed, cause the controller to:

indicate electrical degradation of the mechanical fuel level indicator responsive to receiving a first output of the mechanical fuel level indicator during upward travel and a second output of the mechanical fuel level indicator during downward travel, the first and second outputs of the mechanical fuel level indicator indicating a coincident range of inconsistency in the output of the mechanical fuel level indicator;

report, via the in-dash fuel level gauge, a current fuel level that is not based on an output of the mechanical fuel level indicator when the output of the mechanical fuel level indicator is within the coincident range of inconsistency.

18. The vehicle fuel system of claim 17, wherein the current fuel level that is not based on the output of the mechanical fuel level indicator is instead based on an output of the fuel tank pressure sensor during a refueling event, and further based on an amount of fuel delivered to the vehicle engine by the one or more fuel injectors during a fuel consumption cycle immediately following the refueling event.

19. The vehicle fuel system of claim 17, wherein the controller is further configured with instructions stored in non-transitory memory, that when executed, cause the controller to:
    indicate mechanical degradation of the mechanical fuel level indicator responsive to receiving a first output of the mechanical fuel level indicator during upward travel and a second output of the mechanical fuel level indicator during downward travel, the first and second outputs of the mechanical fuel level indicator indicating distinct ranges of inconsistency in the output of the mechanical fuel level indicator.

\* \* \* \* \*